US012775485B2

(12) United States Patent
Patel et al.

(10) Patent No.: US 12,775,485 B2
(45) Date of Patent: Oct. 27, 2026

(54) DEVICES AND METHODS FOR TRAFFIC SHAPING ARBITRATION TO FETCH COMMANDS FROM A HOST WITH MULTIPLE VIRTUAL MACHINES

(71) Applicant: SK Hynix NAND Product Solutions Corp., Rancho Cordova, CA (US)

(72) Inventors: Dimpesh Patel, Surrey (CA); Jonathan Hughes, Longmont, CO (US); Teddy Greer, Grayson, KY (US); Jonathan de Vries, Folsom, CA (US); Zachary Fu, Coquitlam (CA)

(73) Assignee: Solidigm Inc., Rancho Cordova, CA (US)

( * ) Notice: Subject to any disclaimer, the term of this patent is extended or adjusted under 35 U.S.C. 154(b) by 327 days.

(21) Appl. No.: 18/659,858

(22) Filed: May 9, 2024

(65) Prior Publication Data

US 2025/0348343 A1 Nov. 13, 2025

(51) Int. Cl.
*G06F 9/455* (2018.01)

(52) U.S. Cl.
CPC .................... *G06F 9/45558* (2013.01); *G06F 2009/45579* (2013.01)

(58) Field of Classification Search
CPC ................... G06F 9/45558; G06F 2009/45579
See application file for complete search history.

(56) References Cited

U.S. PATENT DOCUMENTS

2014/0181807 A1* 6/2014 Fonseca ................ G06F 9/5083 718/1
2018/0217951 A1 8/2018 Benisty et al.
2020/0151134 A1 5/2020 Helmick et al.
2021/0181989 A1 6/2021 Jung et al.
2021/0203740 A1 7/2021 Xie et al.

FOREIGN PATENT DOCUMENTS

CN 116225991 A 6/2023

* cited by examiner

*Primary Examiner* — Wissam Rashid
(74) *Attorney, Agent, or Firm* — HG LAW LLP

(57) ABSTRACT

A device and related method, the device communicatively coupled to a host, and the device including arbitration circuitry, command fetch circuitry, and processing circuitry. For each virtual machine of the host, arbitration circuitry determines (a) first credits value indicative of a number of commands that may be fetched and (b) a second credits value indicative of a bandwidth to fetch at least one command, from a queue group associated with the virtual machine. The arbitration circuitry selects a virtual machine based on at least one of the first credits values and the second credits values of the virtual machines, and communicates a signal to command fetch circuitry to fetch at least one command. In response to the reception of the signal, the command fetch circuitry fetches at least one command from the queue group associated with the selected virtual machine and communicates the fetched commands to processing circuitry for execution.

33 Claims, 6 Drawing Sheets

DEVICES AND METHODS FOR TRAFFIC SHAPING ARBITRATION TO FETCH COMMANDS FROM A HOST WITH MULTIPLE VIRTUAL MACHINES

TECHNICAL FIELD

The present disclosure is directed to devices and methods for managing the fetching of commands of a host.

SUMMARY

In accordance with the present disclosure, devices and methods for managing the fetching arbitration of commands from virtual machines of a host which is communicatively coupled to the device (e.g., a storage device). The device (e.g., a solid-state drive (SSD) device) includes system memory, which includes temporary storage (e.g., queue groups) for commands received from the host, and memory, which may include memory blocks with pages or super pages of memory. The device and method disclosed herein may use firmware of the device along with arbitration circuitry, command fetch circuitry, and processing circuitry to perform managing the fetching arbitration of commands from virtual machine and execution of the fetched commands. Managing the fetching arbitration of commands from virtual machines of a host may improve hardware resources requirements and command bandwidth fairness between virtual machines of the host. The improved hardware resource requirements and improved command bandwidth fairness between virtual machines results in an improved performance speed of device to fetch and execute commands. The commands from the virtual machines of the host may include any one or more read or write requests, such as direct memory access (DMA) commands.

The device (e.g., SSD device) may include arbitration circuitry, which, for each respective virtual machine of the host, determines a first credits value indicative of a number of commands that are capable of being fetched from a queue group associated with the respective virtual machine and determines a second credits value indicative of a bandwidth for fetching at least one command from the queue group associated with the respective virtual machine. In some embodiments, each queue group associated with a respective virtual machine includes a submission queue to temporarily store the commands of the host, and a completion queue to store command fetch responses. Once the first credits value and the second credits value for each virtual machine of the host has been determined, the arbitration circuitry is further to select a virtual machine based on at least one of the first credits value and the second credits value for each of virtual machines of the host, and communicate a signal to the command fetch circuitry to fetch at least one command from a queue group associated with the selected virtual machine. In some embodiments, command fetch circuitry generates a command fetch request and transmits the command fetch request to the system memory. The device also includes command fetch circuitry communicatively coupled to the arbitration circuitry, where the command fetch circuitry receives the signal from the arbitration circuitry, and in response to the reception of the signal, fetches at least one command from the queue group associated with the selected virtual machine and communicates the at least one fetched command to processing circuitry of the device for execution. In some embodiments, at least one command from the selected queue group is sent to the processing circuitry by using a command fetch response, which includes at least one fetched command. In some embodiments, the command is a read command, which includes a memory address from which to access read data in the memory of the device. In other embodiments, the command is a write command, which includes write data and a memory address at which to store the write data in the memory.

In some embodiments, the arbitration circuitry determines a state for each of the first credits value and the second credits value of each virtual machine. The arbitration circuitry is configured to, for each respective virtual machine, compare the first credits value of the virtual machine to at least a first predetermined value to determine a state of the first credits value for the respective virtual machine and compare the second credits value of the virtual machine to at least a second predetermined value to determine a state of the second credits value for the respective virtual machine.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

Figure 1:
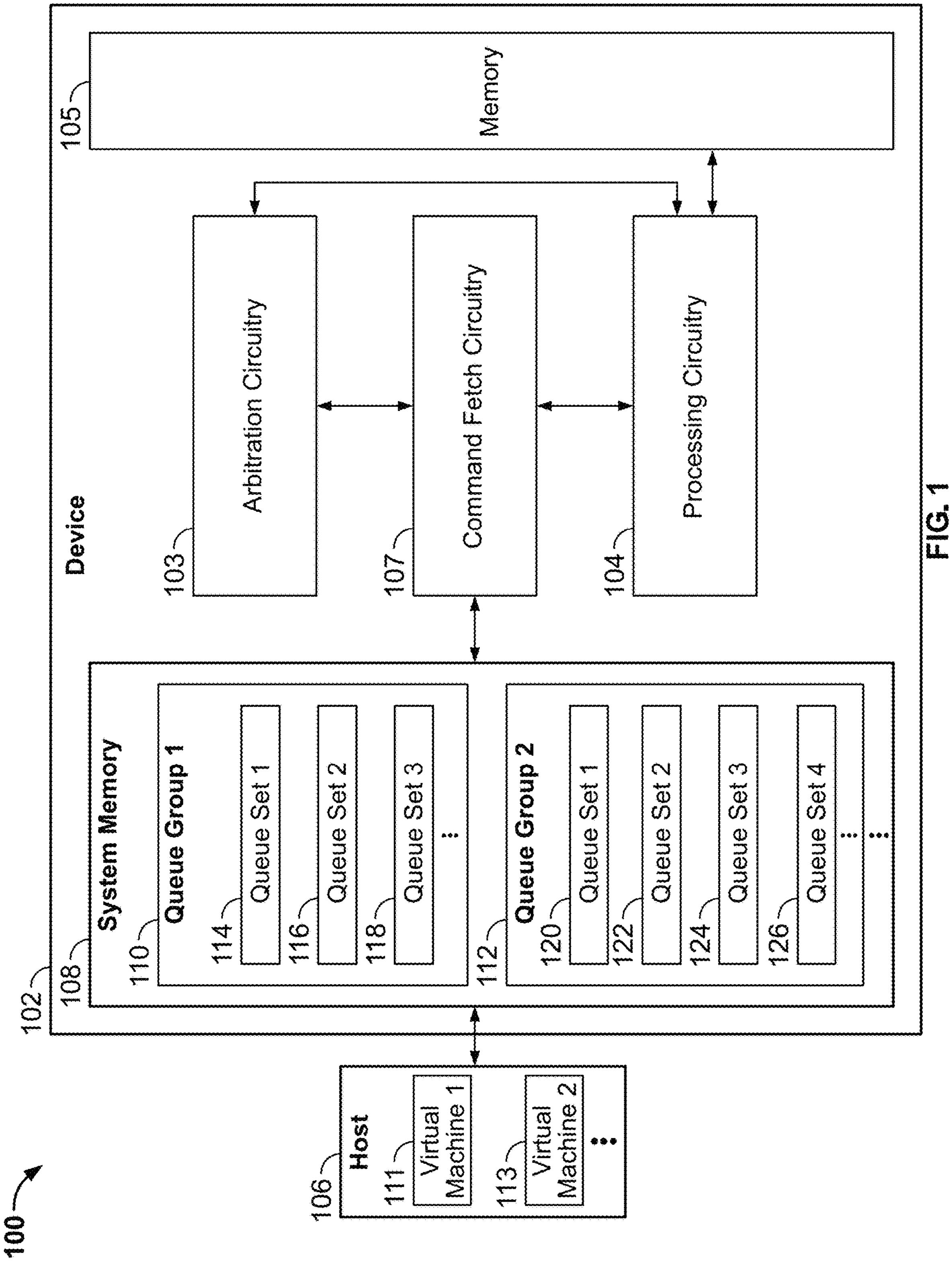
FIG. 1 shows an illustrative diagram of a system that includes a host and a device with command fetch circuitry, arbitration circuitry, and processing circuitry, in accordance with some embodiments of the present disclosure.

In accordance with the present disclosure, devices and methods are provided for managing the fetching arbitration of commands from virtual machines of a host which is communicatively coupled to the device (e.g., a storage device). The device (e.g., an SSD device) includes system memory, arbitration circuitry, command fetch circuitry, and processing circuitry. The system memory includes temporary storage for commands from the host. In some embodiments, the device may include memory, which may include memory blocks with pages or super pages of memory. The device and method disclosed herein may use firmware of the device along with arbitration circuitry to select a virtual machine from which to fetch commands, command fetch circuitry to fetch commands from a queue group associated with the selected virtual machine, and processing circuitry to execute the fetched commands from the host. The commands may include any one or more read or write requests, such as direct memory access (DMA) commands.

The virtual machines of the host communicatively coupled to the device may include commands of varying size, which when paired with command bursts when the device fetches commands, may result in unfair command fetching arbitration. The management of fetching arbitration disclosed herein improves the accounting of processing resources and processing bandwidth resources allocated to fetch commands from each virtual machine of the host.

The device (e.g., SSD device) may include arbitration circuitry, which, for each respective virtual machine of the host, determines a first credits value indicative of a number of commands that are capable of being fetched from a queue group associated with the respective virtual machine and determines a second credits value indicative of a bandwidth for fetching at least one command from the queue group associated with the respective virtual machine. In some embodiments, each queue group associated with a respective virtual machine includes a submission queue to temporarily store the commands of the host, and a completion queue to store command fetch responses. Once the first credits value and the second credits value for each virtual machine of the host has been determined, the arbitration circuitry is further to select a virtual machine based on at least one of the first credits value and the second credits value for each of virtual machines of the host, and communicate a signal to the command fetch circuitry to fetch at least one command from a queue group associated with the selected virtual machine. In some embodiments, command fetch circuitry generates a command fetch request and transmits the command fetch request to the system memory. The device also includes command fetch circuitry communicatively coupled to the arbitration circuitry, where the command fetch circuitry receives the signal from the arbitration circuitry, and in response to the reception of the signal, fetches at least one command from the queue group associated with the selected virtual machine and communicates the at least one fetched command to processing circuitry of the device for execution. In some embodiments, at least one command from the selected queue group is sent to the processing circuitry by using a command fetch response, which includes at least one fetched command. In some embodiments, the command is a read command, which includes a memory address from which to access read data in the memory of the device. In other embodiments, the command is a write command, which includes write data and a memory address at which to store the write data in the memory.

For purposes of brevity and clarity, the features of the disclosure described herein are in the context of a device (e.g., an SSD device) having arbitration circuitry, command fetch circuitry, processing circuitry and memory. In some embodiments, each of the arbitration circuitry and command fetch circuitry is part of the processing circuitry. The principles of the present disclosure may be applied to any other suitable context for a device that manages the fetching arbitration of commands from virtual machines of a host. The device may include processing circuitry and persistent storage media, which are communicatively coupled to each other by a data bus or interface. In some embodiments, the commands are fetched from the host to the device via a network bus or interface.

In particular, the present disclosure provides devices and methods that improves hardware resources requirements (e.g., gate count reduction) and command bandwidth fairness between virtual machines of the host. The improved hardware resource requirements and improved command bandwidth fairness between virtual machines results in an improved performance speed of device to fetch and execute commands.

In some embodiments, each of the arbitration circuitry, command fetch circuitry, and processing circuitry includes a processor. In some embodiments, processing circuitry includes a memory controller. In some embodiments, each processor of the arbitration circuitry, command fetch circuitry, and processing circuitry may be a highly parallelized processor capable of handling high bandwidths of incoming commands and signals quickly. For example, the processing circuitry may start simultaneous processing of commands before completion of previously fetched commands. In some embodiments, the processor is to execute commands concurrently and independently with respect to the memory controller processing command from the virtual machines of the host.

The memory of the device may be referred to as the main memory of the device. In some embodiments, the main memory of the device disclosed herein may contain any of the following memory densities: single-level cells (SLCs), multi-level cells (MLCs), triple-level cells (TLCs), quad-level cells (QLCs), penta-level cells (PLCs), and any suitable memory density that is greater than five bits per memory cell.

In some embodiments, the device and methods of the present disclosure may refer to a storage device (e.g., an SSD device) which is communicatively coupled to a host (e.g., host devices) by a network bus or interface. In some embodiments, the device is communicatively coupled to more than one host, each host with at least two virtual machines, and each host may send commands for the device to fetch and execute.

An SSD is a data storage device that uses integrated circuit assemblies as memory to store data persistently. SSDs have no moving mechanical components, and this feature distinguishes SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and includes a type of non-volatile storage technology. Quality of Service (QOS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The subject matter of this disclosure may be better understood by reference to FIGS. 1-6.

FIG. 1 shows an illustrative diagram of a system 100 that includes a host 106 and a device 102 with command fetch circuitry 107, arbitration circuitry 103, and processing circuitry 104, in accordance with some embodiments of the present disclosure. In some embodiments, device 102 may be a storage device such as a solid-state storage device (e.g., an SSD device). In some embodiments, each of command fetch circuitry 107, arbitration circuitry 103, and processing circuitry 104 may include a processor or any suitable processing unit. In some embodiments, memory 105 may include non-volatile memory. It will be understood that the embodiments of the present disclosure are not limited to SSDs. For example, in some embodiments, device 102 may include a hard disk drive (HDD) device in addition to or in place of an SSD. In some embodiments, system memory 108 may be implemented as temporary memory (e.g., cache or any suitable volatile memory) including queue groups (e.g., first queue group 110 and second queue group 112) which include at least one queue set (e.g., 114, 116, 118, 120, 124, 126) to store commands received from host 106.

Device 102 is configured to fetch commands from host 106 and store the commands in system memory 108. System memory 108 is divided into queue groups (e.g., first queue group 110 and second queue group 112), each of which includes at least one queue set (e.g., 114, 116, 118, 120, 124, 126). In some embodiments, each queue set (e.g., 114, 116, 118, 120, 124, 126) includes a submission queue at which to receive and store the received commands from host 106, and a completion queue to store command fetch responses. In some embodiments, a respective command received from host 106 may be stored in a queue group (e.g., first queue group 110 and second queue group 112) based on the virtual machine of host 106 from which the command originates. Host 106 includes at least two virtual machines (e.g., first virtual machine 11 and second virtual machine 113), and the system memory 108 maps a corresponding queue group to the each of the virtual machines (e.g., first virtual machine 110 and second virtual machine 113). For example, first queue group 110 and its respective queue sets (e.g., 114, 116, and 118) may be mapped to the first virtual machine 111 of host 106 and store commands which are associated with the first virtual machine 111 and second queue group 112 and its respective queue sets (e.g., 120, 122, 124, and 126) may be mapped to the second virtual machine 113 of host 106 and store commands which are associated with the second virtual machine 113.

The number of queue groups (e.g., first queue group 110 and second queue group 112) and their respective queue sets (e.g., 114, 116, 118, 120, 124, 126) may be allocated according to any one or more of (a) characteristics of the commands (e.g., type of command and size of command), (b) workload priority associated with the commands, (c) frequency at which commands are received for each virtual machine, (d) number of virtual machines of host 106, and (e) available memory of system memory 108. For example, the first queue group 110 may be configured to store commands from the first virtual machine 111 and the second queue group 112 may be configured to store commands from the second virtual machine 113. In such an example, the available memory of system memory 108 may be allocated such that the second queue group 112 includes more queue sets than the first queue group 110. In some embodiments, each queue set (e.g., 114, 116, 118, 120, 124, 126) may be of the same allocated memory size. In some embodiments, each queue set (e.g., 114, 116, 118, 120, 124, 126) may be of variable allocated memory size, i.e., some selected queue sets may be of a larger allocated memory size than other queue sets. Although the aforementioned examples described herein and FIG. 1 illustrates system memory 108 with two queue groups (e.g., first queue group 110 and second queue group 112), system memory 108 may include more than two queue groups. Furthermore, although FIG. 1 illustrates each queue group (e.g., first queue group 110 and second queue group 112) with three or four queue sets (e.g., 114, 116, 118, 120, 124, 126), each queue group may include one or more queue sets based on the size of queue sets and the available memory that may be allocated in system memory 108. In some embodiments, each queue set (e.g., 114, 116, 118, 120, 124, 126) may be implemented as any first-in first-out data structure (e.g., queue).

In some embodiments, system memory 108 is volatile memory, which may include any one or more volatile memory, such as Static Random Access Memory (SRAM). In some embodiments, volatile memory is configured to temporarily store data (e.g., commands received from host 106 and command fetch responses) while command fetch circuitry 107 fetches commands, arbitration circuitry 103 selects a queue group from which to fetch a command, and processing circuitry 104 processes commands. In some embodiments, command fetch circuitry 107 is communicatively coupled to volatile memory to store and access commands received from host 106. In some embodiments, a data bus interface is used to transport commands or command data from volatile memory to command fetch circuitry 107. In some embodiments, command fetch circuitry 107 is communicatively coupled to processing circuitry 104 to transport fetched commands to the processing circuitry 104 to be processed.

Although FIG. 1 shows each queue group (e.g., first queue group 110 and second queue group 112) in system memory 108, in some embodiments each queue group (e.g., 110 and 112) and each queue set (e.g., 114, 116, 118, 120, 122, 124, and 126), and the associated data (e.g., commands and command fetch responses) of the queue sets are stored in host 106. In some embodiments, host 106 includes host memory to store each queue group (e.g., 110 and 112), their respective queue sets (e.g., 114, 116, 118, 120, 122, 124, and 126) and the associated data (e.g., commands and command fetch responses). In such embodiments, command fetch circuitry 107 may fetch commands stored in host memory of host 106 in a similar manner to as to fetch commands stored in system memory 108 of the device 102 discussed herein.

Each respective virtual machine (e.g., first virtual machine 111 and second virtual machine 113) of host 106 includes at least one application which is mapped to the queue group associated with the respective virtual machine (e.g., first virtual machine 111 and second virtual machine 113). In some embodiments, each respective virtual machine (e.g., first virtual machine 111 and second virtual machine 113) uses a virtualization scheme such as Multi-Function NVMe Device (MFND), Single Root—I/O Virtualization (SR-IOV) and Scalable I/O Virtualization (SIOV). Although FIG. 1 illustrates host 106 with first virtual machine 111 and second virtual machine 113, host 106 may include more than two virtual machines. In addition, device 102 may be communicatively coupled to more than one host (e.g., host 106), each of which includes virtual machines (e.g., first virtual machine 111 and second virtual machine 113).

The arbitration circuitry 103 of device 102 is configured to determine a first credits value indicative of a number of commands capable of being fetched from a queue group (e.g. first queue group 110 and second queue group 112) associated with the respective virtual machine (e.g., first virtual machine 111 and second virtual machine 113). In some embodiments, the first credits value for a respective virtual machine (e.g., first virtual machine 111 and second virtual machine 113) determined by arbitration circuitry 103 as a number of commands (e.g., Input/Outputs (I/Os)) which may be fetched from the queue group (e.g., 110 and 112) of the associated virtual machine (e.g., 111 and 113). In some embodiments, the first credits value of a virtual machine is determined based on an amount of processing resources allocated for fetching a number commands from the queue group (e.g., 110 and 112) associated with the virtual machine (e.g., 111 and 113). The first credits value may be initialized at an initial state and an initial first credits value, which may be preset prior to operation of device 102. The first credits value of a respective virtual machine (e.g., 111 and 113) may be updated over time, such that the first credits value decreases as commands are fetched from the queue group (e.g., 110 and 112) associated with the respective virtual machine (e.g., 111 and 113). In addition, the first credits value may be increased due to a refill of first credits value. In some embodiments refills occur once after a repeated refill timer has completed one cycle. This ensures that device 102 is allocated with the processing resources to fetch commands from each respective virtual machine (e.g., 111 and 113) of host 106. In some embodiments, the first credits value is also updated by the completion of a cycle of a carryover timer, which is used to reset the first credits value to a respective initial first credits value to ensure a steady state exchange of processing resources to fetch commands from the virtual machine (e.g., 111 and 113) of host 106. Once the arbitration circuitry 103 determines the first credits value of the respective virtual machine (e.g., 111 and 113) of host 106, the arbitration circuitry 103 then determines a second credits value of the respective virtual machine (e.g., 111 and 113).

The arbitration circuitry 103 of device 102 is configured to determine a second credits value indicative of a bandwidth for fetching at least one command from the queue group (e.g., 110 and 112) associated with the respective virtual machine (e.g., 111 and 113). In some embodiments, the second credits value for a respective virtual machine (e.g., 111 and 113) determined by arbitration circuitry 103 as an amount of processing bandwidth allocated to fetch commands (e.g., amount of data associated with fetched commands) from the queue group (e.g., 110 and 112) of the associated virtual machine (e.g., 111 and 113). In some embodiments, the second credits value of a virtual machine (e.g., 111 and 113) is determined based on an amount of processing bandwidth resources allocated for fetching an amount of data associated with commands of the queue group (e.g., 110 and 112) associated with the virtual machine (e.g., 111 and 113). The second credits value may be initialized at an initial state and an initial second credits value, which may be preset prior to operation of device 102. The second credits value of a respective virtual machine (e.g., 111 and 113) may be updated over time, such that the second credits value decreases as commands are fetched from the queue group (e.g., 110 and 112) associated with the respective virtual machine (e.g., 111 and 113). In addition, the second credits value may increase due to a refill of the second credits value. In some embodiments refills occur once after a repeated refill timer has completed one cycle. This ensures that device 102 is allocated with the processing bandwidth resources to fetch commands of a certain data size from each respective virtual machine (e.g., 111 and 113) of host 106. In some embodiments, the second credits value is also updated by the completion of a cycle of a carryover timer, which is used to reset the second credits value to a respective initial second credits value to ensure a steady state exchange of processing bandwidth resources to fetch commands from the virtual machine (e.g., 111 and 113) of host 116.

Once arbitration circuitry 103 evaluates each virtual machine (e.g., 111 and 113) of host 106, arbitration circuitry 103 selects a virtual machine (e.g., 111 and 113) based on at least one of the first credits value and the second credits value for each of the virtual machines (e.g., 111 and 113) of host 116. In some embodiments, arbitration circuitry 103 determines a state for each of the first credits value and the second credits value of the virtual machine (e.g., 111 and 113). The state of the first credits value is based on the first credits value and at least a first predetermined value. The state of the second credits value is based on the second credits value and at least a second predetermine value. In some embodiments, each predetermined value for the first credits value and second credits value may be preset prior to operation of device 102 and command fetch arbitration. In some embodiments, each predetermined value is configured based on a priority to fetch commands from a queue group (e.g., first queue group 110 and second queue group 112) associated with a virtual machine (e.g., 111 and 113) at a respective amount of processing resources to fetch commands or a respective amount of processing bandwidth resources to fetch commands. For example, when the state of each of the first credits value is based on one predetermined value (e.g., first predetermined value for first credits value and second predetermined value for second credits value), there are two possible states (e.g., a first state and a second state) that may be determined for each of the first credits value and a second credits value. In such an example, the first state is of a higher priority than the second state, such that the arbitration circuitry 103 selects a first virtual machine (e.g., first virtual machine 111) of a first state over a second virtual machine (e.g., second virtual machine 113) of a second state from which to fetch commands, wherein each of the first state and second state refers to either a state of first credits value or a state of second credits value. The arbitration circuitry 103 is configured to select the virtual machine (e.g., 111 and 113) based on at least one of a highest state of first credits value and a highest state of second credits value. In some embodiments, when two or more respective virtual machines of the virtual machines (e.g., 111 and 113) of host 106 are of the same first credits value state and second credits value state, the arbitration circuitry 103 randomly selects among the two or more respective virtual machines (e.g., 111 and 113). In some embodiments, when two or more respective virtual machines of the virtual machines (e.g., 111 and 113) of host 106 are of the same first credits value state and second credits value state, the arbitration circuitry 103 selects among the two or more respective virtual machines using a weighted priority selection. Therefore, when first virtual machine (e.g., first virtual machine 111) of a high priority and a second virtual machine (e.g., second virtual machine 113) of low priority are of the same first credits value state and second credits value state, the arbitration circuitry 103 selects the first virtual machine (e.g., first virtual machine 111) and associated queue group (e.g., first queue group 110) from which to fetch commands. In some embodiments, the arbitration circuitry 103 selects a virtual machine (e.g., 111 and 113) based on the first credits value for each of the at least two virtual machines of host 106. In some embodiments, the arbitration circuitry 103 selects a virtual machine (e.g., 111 and 113) based on the second credits value for each of the at least two virtual machines (e.g., 111 and 113) of host 106. Once the arbitration circuitry 103 selects a virtual machine (e.g., 111 and 113) based on at least one of the first credits value and the second credits value for each of the at least two virtual machines (e.g., 111 and 113), the arbitration circuitry 103 communicates a signal to the command fetch circuitry 107 to fetch at least one command from the queue group (e.g., 110 and 112) associated with the selected virtual machine.

The arbitration circuitry 103 is further configured to communicate a signal to the command fetch circuitry 107 of device 102 to fetch at least one command from a queue group (e.g., 110 and 112) associated with the selected virtual machine (e.g., 111 and 113). In some embodiments, the signal includes data indicative of the selected virtual machine from which to fetch at least one command. Once the arbitration circuitry 103 communicates the signal to the command fetch circuitry 107 to fetch at least one command from the queue group (e.g., first queue group 110 and second queue group 112) associated with the selected virtual machine, the command fetch circuitry 107 receives the signal from the arbitration circuitry 103.

The command fetch circuitry 107 is configured to receive the signal from the arbitration circuitry 103 and once the command fetch circuitry 107 receives the signal from the arbitration circuitry 103, the command fetch circuitry 107 determines whether the signal was received from the arbitration circuitry 103. When command fetch circuitry 103 does not receive the signal from the arbitration circuitry 103, i.e., the signal is lost or corrupted during the transit from the arbitration circuitry 103, the arbitration circuitry 103 then communicates the signal to the command fetch circuitry 107 of device 102 to fetch at least one command from the queue group (e.g., 110 and 112) associated with the selected virtual machine. When the command fetch circuitry 107 does receive the signal from the arbitration circuitry 103, the command fetch circuitry 107 fetches at least one command from the queue group (e.g., 110 and 112) associated with the selected virtual machine. The command fetch circuitry 107 fetches at least one command from the queue group (e.g., 110 and 112) associated with the selected virtual machine. In some embodiments, the command fetch circuitry 107 sends at least one command fetch request to system memory 108 to fetch at least one command from the queue group (e.g., 110 and 112) associated with the selected virtual machine. In some embodiments, the command fetch circuitry 107 sends at least one command fetch request to host 106 to fetch at least one command from the queue group associated with the selected virtual machine stored on host 106. The command fetch request may include data indicative of the virtual machine (e.g., 111 and 113) from which to fetch commands and a number of commands to be fetched from the associated queue group (e.g., 110 and 112). The commands fetched from the queue group (e.g., 110 and 112) associated with the selected virtual machine may be from at least one of the queue sets (e.g., 114, 116, 118, 120, 122, 124, and 126) of the queue group (e.g., 110 and 112). In some embodiments, commands are fetched from queue sets (e.g., 114, 116, 118, 120, 122, 124, and 126) of the queue group (e.g., 110 and 112) associated with the selected virtual machine based on a respective priority of each queue set (e.g., 114, 116, 118, 120, 122, 124, and 126). Therefore, a first subset of commands fetched from a first queue set of the queue group may be of a high priority, and a second subset of commands subsequently fetched from a second queue set of the queue group may be of a lower priority. In some embodiments, the queue set of the queue group associated with the selected virtual machine from which commands are fetched is selected at random. In some embodiments, the command fetch circuitry 107 fetches commands until any one of the following conditions are met: (a) each command stored in the queue group associated with the selected virtual machine has been fetched, (b) the first credits value of the selected virtual machine has decreased below a halting first credits value, (c) the second credits value of the selected virtual machine has decreased below a halting second credits value, and (d) the command fetch circuitry 107 receives a reset signal. The command fetch circuitry 107 fetches commands which are stored in the submission queue of the queue sets (e.g., 114, 116, 118, 120, 122, 124, and 126) within the queue group (e.g., 110 and 112) associated with the selected virtual machine. Once a command is fetched from the submission queue, the system memory 108 generates a command fetch response which includes at least one fetched command and relevant information regarding the at least one fetched command (e.g., command type and data size). In some embodiments, when the command fetch circuitry 107 fetches commands from queue groups (e.g., 110 and 112) stored on host 106, host 106 generates the command fetch response which includes at least one fetched command. The command fetch response may be stored in the corresponding completion queue of the queue set (e.g., 114, 116, 118, 120, 122, 124, and 126) from which the command was fetched. When the command fetch circuitry 107 fetches a command from the queue group (e.g., 110 and 112) associated with a respective virtual machine, the command fetch circuitry 107 may communicate a signal to the arbitration circuitry 103 to decrement the first credits value of the respective virtual machine to reflect a use of the processing resource to fetch commands from the respective virtual machine (e.g., 111 and 113). In some embodiments, the command fetch circuitry 107 may determine the data size of the fetched command based on the command fetch response. In such embodiments, the command fetch circuitry 107 may communicate a signal to the arbitration circuitry 103 to decrement the second credits value of the respective virtual machine to reflect the amount of bandwidth required to fetch the command of the command fetch response from the respective virtual machine (e.g., 111 and 113). The command fetch response is then sent to the command fetch circuitry 107 to be communicated to the processing circuitry 104 for execution. The command fetch circuitry 107 then communicates the at least one fetched command to processing circuitry 104 for execution. In some embodiments, the processing circuitry 104 communicates a signal to the arbitration circuitry 103 to decrement the second credits value of the respective virtual machine to reflect the amount of bandwidth required to fetch the command of the command fetch response from the respective virtual machine.

For purposes of brevity and clarity, the features of the disclosure described herein are in the context of a device 102 (e.g., an SSD device) having command arbitration circuitry 103, command fetch circuitry 107, processing circuitry 104 and system memory 108. However, the principles of the present disclosure may be applied to any other suitable context in which a device fetches and executes commands from a virtual machine of a host. The device 102 may include processing circuitry 104, arbitration circuitry 103, and system memory 108, which are each communicatively coupled to command fetch circuitry 107 by network buses or interfaces. In some embodiments, arbitration circuitry 103 and processing circuitry are also communicatively coupled to update the second credits value for a respective virtual machine. In some embodiments, the device receives commands from a host 106 through a port. In some embodiments, the device may receive commands from multiple hosts with virtual machines. In some embodiments, the commands are sent from a virtual machine (e.g., first virtual machine 111 and second virtual machine 113) of any of the hosts (e.g., host 106) to the device via a network bus or interface.

Device 102 receives commands from host 106 through a port, where the host 106 and the port are communicatively coupled by the network bus. The network bus may transport commands and data between host 106 and device 102. The network bus may transport commands and data using a Non-Volatile Memory Express (NVMe), Peripheral Component Interconnect Express (PCIe), or any other suitable network protocol.

Additionally, device 102 includes memory 105. Memory 105 may also be hereinafter referred to as main memory of device 102. In some embodiments, memory 105 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, memory 105 includes memory of a memory density, the memory density is any one of (a) single-level cell (SLC) memory density, (b) multi-level cell (MLC) memory density, (c) tri-level cell (TLC) memory density, (d) quad-level cell (QLC) memory density, (e) penta-level cell (PLC) memory density, or (f) a memory density of greater than 5 bits per memory cell. Processing circuitry 104 is communicatively coupled to memory 105 to store and access data in memory blocks or pages of memory 105. In some embodiments, a data bus interface is used to transport data transfer requests or data. In some embodiments, the data bus interface includes a data transfer request bus and a data interface. In some embodiments, memory 105 includes multiple memory die. In some embodiments, memory 105 includes multiple bands of memory, each band spanning across each memory die. In some embodiments, memory 105 may be accessed (e.g., read or written to) using direct memory access (DMA) by the processing circuitry 104. In such embodiments, the processing circuitry 104 includes a processor to fetch and execute commands, and a memory controller (e.g., a DMA controller) to process and perform DMA transfers independent of the execution of instructions by the processor.

In some embodiments, each processor or processing unit of command fetch circuitry 107, arbitration circuitry 103, and processing circuitry 104 may include a hardware processor, a software processor (e.g., a processor emulated using a virtual machine), or any combination thereof. The processor of processing circuitry 104 may include any suitable software, hardware, or both for communicating with command fetch circuitry 107 and arbitration circuitry 103, and controlling memory 105 and processing circuitry 104 while executing commands. In some embodiments, device 102 may further include a multi-core processor. In some embodiments, processing circuitry 104 includes a memory controller (e.g., direct memory access (DMA) controller), which may include any suitable software, hardware, or both for accessing memory 105 independent of the processor which executes commands. Memory 105 may also include hardware elements for non-transitory storage of instructions, commands, or requests.

In some embodiments, device 102 may be a storage device (for example, SSD device) which may include one or more packages of memory dies (e.g., memory 105), where each die includes storage cells. In some embodiments, the storage cells are organized into pages or super pages, such that pages and super pages are organized into blocks. In some embodiments, each storage cell can store one or more bits of information.

For purposes of clarity and brevity, and not by way of limitation, the present disclosure is provided in the context of managing the fetching arbitration of commands from virtual machines of a host. The process of managing the fetching arbitration of commands from virtual machines of a host may be configured by any suitable software, hardware, or both for implementing such features and functionalities. Managing the fetching arbitration of commands from virtual machines of a host may be at least partially implemented in, for example, device 102 (e.g., as part of arbitration circuitry 103, processing circuitry 104, command fetch circuitry 107, or any other suitable device). For example, for a solid-state storage device (e.g., device 102), managing the fetching arbitration of commands from virtual machines of a host may be implemented in arbitration circuitry 103, command fetch circuitry 107, and processing circuitry 104. Managing the fetching arbitration of commands from virtual machines (e.g., 111 and 113) of a host (e.g., host 106) may improve hardware resources requirements (e.g., gate count reduction) and command bandwidth fairness between virtual machines of the host. The improved hardware resource requirements and improved command bandwidth fairness between virtual machines results in an improved performance speed of device 102 to fetch and execute commands.

Figure 2:
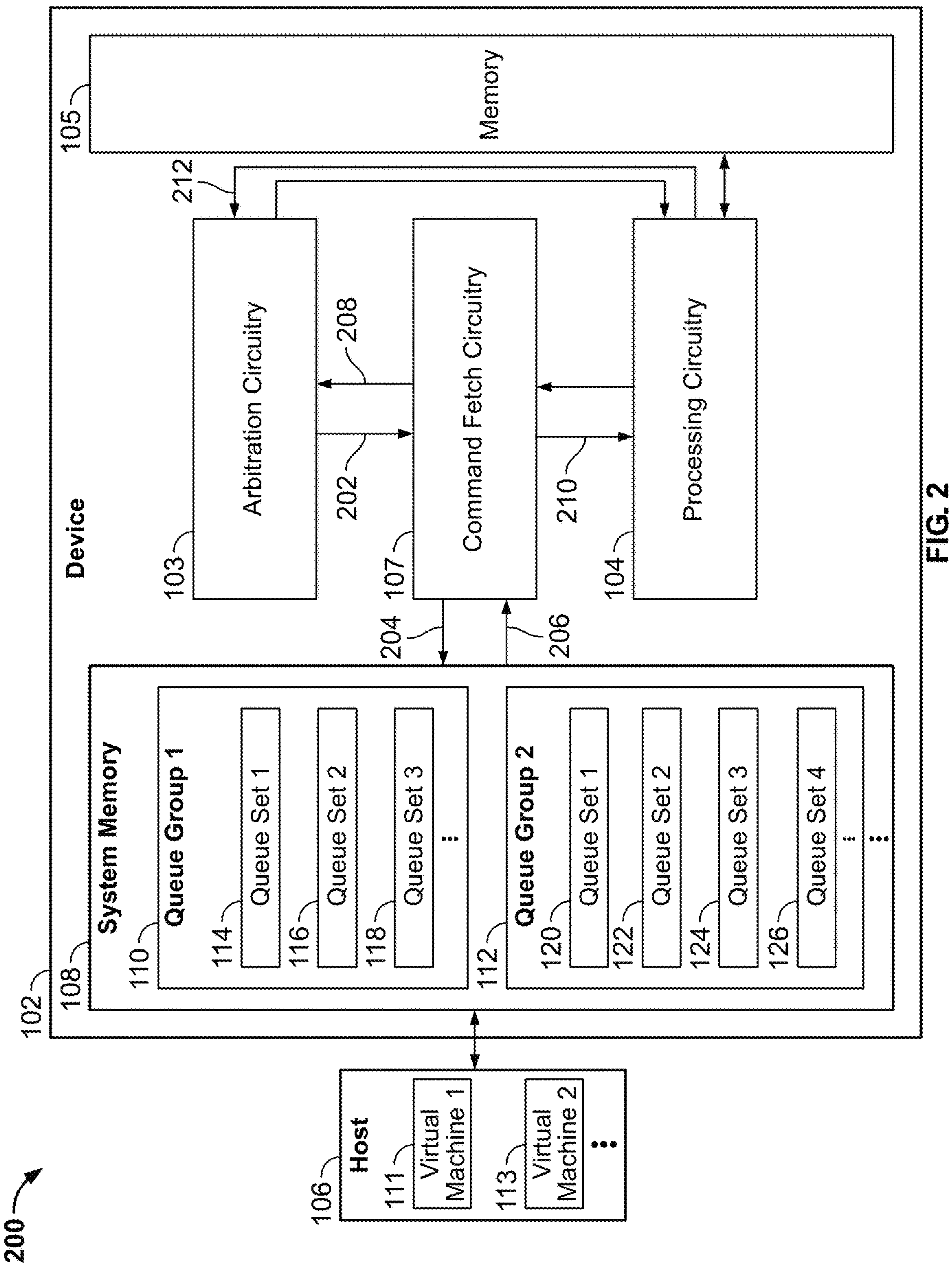
FIG. 2 shows an illustrative diagram of an implementation of the device of FIG. 1 managing example commands received from the host, in accordance with some embodiments of the present disclosure.

FIG. 2 shows an illustrative diagram of an implementation of the device of FIG. 1 managing example commands fetched from the host 106, in accordance with some embodiments of the present disclosure. Although FIG. 2 shows two virtual machines (e.g., 111 and 113) in host 106, and two queue groups (e.g., first queue group 110 and second queue group 112), each associated with a virtual machine, host 106 may include more than two virtual machines and device 102 may include more than two associated queue groups. The virtual machine 111 is associated with the first queue group 110, and the second virtual machine 113 is associated with the second queue group 112. For each respective additional virtual machine (e.g., a third virtual machine) in host 106, device 102 includes a corresponding additional queue group (e.g., a third queue group) associated with the respective additional virtual machine.

As illustrated in FIG. 2, the arbitration circuitry 103 of device 102 selects a virtual machine based on at least one of the first credits value and the second credits value for each of the virtual machines (e.g., first virtual machine 111 and second virtual machine 113) of host 106, and sends a signal 202 to the command fetch circuitry 107. Arbitration circuitry 103 determines a first credits value indicative of a number of commands capable of being fetched from a queue group (e.g., first queue group 110 and second queue group 112) associated with a respective virtual machine (e.g., first virtual machine 111 and second virtual machine 113. In some embodiments, the first credits value of a virtual machine is determined based on an amount of processing resources allocated for fetching a number commands from the queue group associated with the virtual machine. Once the arbitration circuitry 103 determines the first credits value of the respective virtual machine (e.g., 111 and 113) of host 106, the arbitration circuitry 103 then determines a second credits value of the respective virtual machine. The second credits value of the respective virtual machine is indicative of a bandwidth for fetching at least one command from the queue group associated with the respective virtual machine. In some embodiments, the second credits value for a respective virtual machine determined by arbitration circuitry 103 as an amount of processing bandwidth allocated to fetch commands (e.g., data transfer size associated with fetched commands) from the queue group) associated with the virtual machine. In some embodiments, arbitration circuitry 103 determines a respective first credits value and second credits value for each virtual machine (e.g., 111 and 113) before selecting a virtual machine from which to fetch commands. Once the command fetch circuitry 107 receives signal 202 from the arbitration circuitry 103, the command fetch circuitry 107 generates a command fetch request 204.

The command fetch request 204 may include data indicative of the selected virtual machine from which device 102 is to fetch at least one command. In some embodiments, the command fetch request 204 is received by system memory 108 to fetch at least one command from the queue group (e.g., first queue group 110 and second queue group 112) associated with the selected virtual machine. In some embodiments, when the queue groups (e.g., first queue group 110 and second queue group 112) are stored on host 106, the command fetch request 204 is communicated to host 106 to fetch at least one command from a queue group associated with the selected virtual machine. In some embodiments, command fetch circuitry 107 determines whether the signal 202 was received from the arbitration circuitry 103. When the command fetch circuitry 107 does not receive signal 202 from the arbitration circuitry 103, i.e., the signal 202 is lost or corrupted during the transit from the arbitration circuitry 103, the arbitration circuitry 103 may then resend signal 202 to the command fetch circuitry 107 to fetch at least one command from the queue group associated with the selected virtual machine. In some embodiments, the queue set (e.g., 114, 116, 118, 120, 122, 124, and 126) of the queue group (e.g., 110 and 112) associated with the selected virtual machine from which commands are fetched is selected at random. In some embodiments, the command fetch circuitry 107 fetches commands until any one of the following conditions are met: (a) each command stored in the queue group associated with the selected virtual machine has been fetched, (b) the first credits value of the selected virtual machine has decreased below a halting first credits value, (c) the second credits value of the selected virtual machine has decreased below a halting second credits value, and (d) the command fetch circuitry receives a reset signal. The command fetch circuitry 107 fetches commands which are stored in the submission queue of the queue sets within the queue group associated with the selected virtual machine. Once a command is fetched from the submission queue, the system memory generates command fetch response 206 which includes at least one fetched command and relevant information regarding the at least one fetched command (e.g., command type and data size). In some embodiments, when the command fetch circuitry 107 fetches commands from queue groups stored on host 106, host 106 generates the command fetch response 206 which includes at least one fetched command. The command fetch response 206 may be stored in the corresponding completion queue of the queue set from which the command was fetched. The command fetch response 206 is then communicated to the command fetch circuitry 107.

Once command fetch circuitry 107 receives command fetch response 206 from a respective virtual machine (e.g., first virtual machine 111 and second virtual machine 113), the command fetch circuitry 107 communicates a signal 208 to arbitration circuitry 104 to decrement the first credits value of the respective virtual machine, and communicates the fetched command 210 of the command fetch response 206 to processing circuitry 104 for execution. In some embodiments, for each command fetched from a respective virtual machine (e.g., 111 and 113), command fetch circuitry 107 sends a signal (e.g., signal 208) to arbitration circuitry 103 to decrement the first credits value of the respective virtual machine. In some embodiments, fetched command 210 is extracted from the command fetch response 206.

Once processing circuitry 104 receives fetched command 210, processing circuitry 104 executes the fetched command 210. In some embodiments, the fetched command 210 is a read command, which includes a memory address from which to access read data in memory 105 of device 102. In other embodiments, the fetched command 210 is a write command, which includes write data and a memory address at which to store the write data in memory 105. In some embodiments, processing circuitry 104 communicates a signal 212 to arbitration circuitry 103, where signal 212 includes information indicative of the type of command and data transfer size of the fetched command 210. This data included in signal 212 may be used to decrease the second credits value of the virtual machine from which the fetched command 210 originates.

When arbitration circuitry 103 receives either signal 208 from command fetch circuitry 107 or signal 212 from processing circuitry 104, one or more of first credits value and second credits value of the selected virtual machine may be updated. For example, signal 208 from command fetch circuitry 107 may indicate that a respective number of commands have been fetched from a respective virtual machine, and therefore the arbitration circuitry 103 should reduce the first credits value of the respective virtual machine by the respective number of commands which have been fetched. Additionally, each command of the respective number of commands fetched from the respective virtual machine has a respective data transfer size. Signal 212 from processing circuitry 104 includes the respective data transfer size of each command, and therefore the arbitration circuitry 103 should reduce the second credits value of the respective virtual machine by the respective data transfer size of each command of the respective number of commands which have been fetched. In some embodiments, processing circuitry 104 may communicate another signal to arbitration circuitry 103 to increase or reset one or more of the first credits value and the second credits value of a respective virtual machine. For example, each of the first credits value and second credits value may be increased due to refills of first credits value and second credits value, respectively. In some embodiments refills occur once after a repeated refill timer has completed one cycle. This ensures that device 106 is allocated with the processing resources and processing bandwidth resources to fetch commands from each respective virtual machine (e.g., 111 and 113) of the host 106. In some embodiments, either of the first credits value and second credits value is also updated by the completion of a cycle of a carryover timer, which is used to reset either the first credits value or the second credits value to a respective initial first credits value or initial second credits value to ensure a steady state exchange of processing resources or processing bandwidth resources to fetch commands from the virtual machine (e.g., 111 and 113) of the host 106.

Figure 3A:
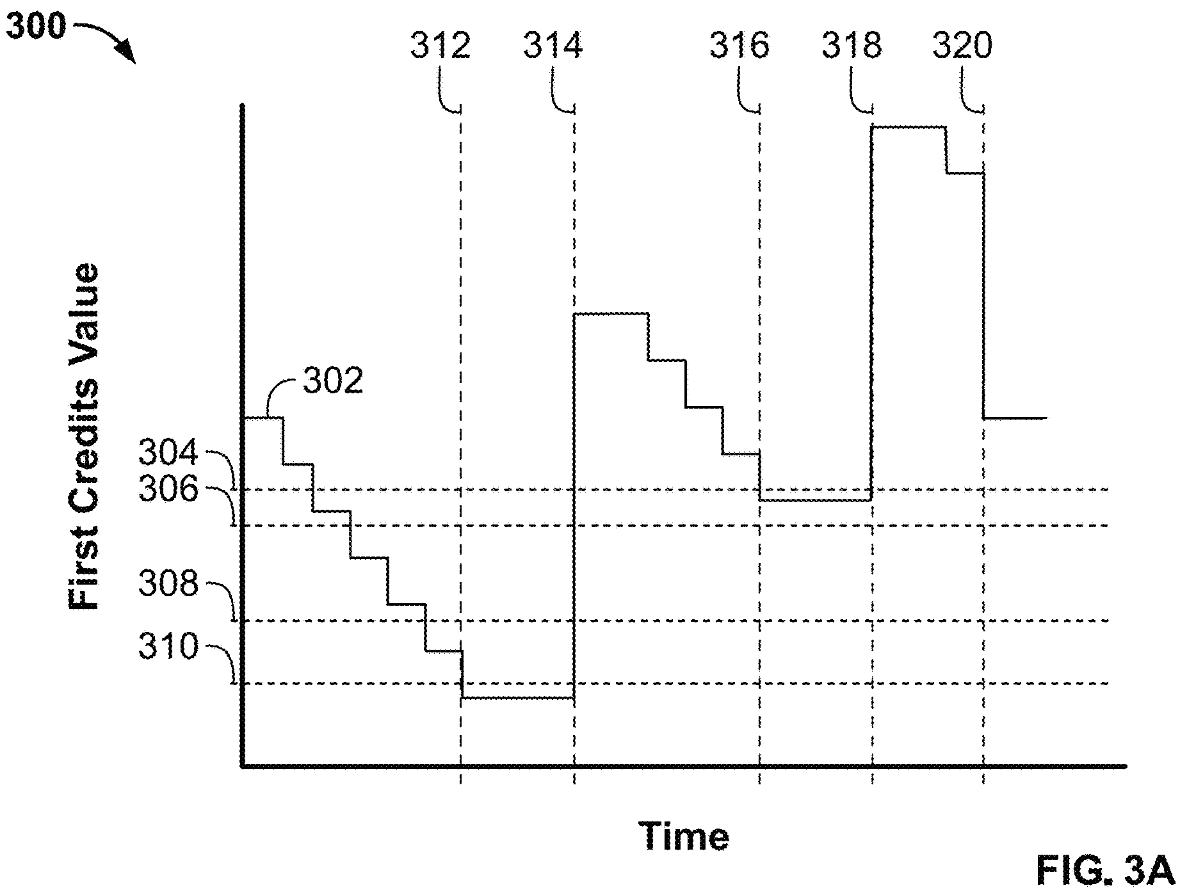
FIG. 3A shows a graph of first credits value over time for an implementation of the device of FIG. 1, in accordance with some embodiments of the present disclosure.

FIG. 3A shows a graph 300 of first credits value over time for an implementation of the device of FIG. 1, in accordance with some embodiments of the present disclosure. In some embodiments, the first credits value of a virtual machine is determined based on an amount of processing resources allocated for fetching a number commands from the queue group associated with the virtual machine. The first credits value may be initialized at an initial state (e.g., first state)

and an initial first credits value 302, which may be preset prior to operation of the device. The first credits value of a respective virtual machine may be updated over time, such that the first credits value decreases as commands are fetched from the queue group associated with the respective virtual machine. The first credits value may be increased due to a refill of first credits value. In some embodiments refills occur once after a repeated refill timer has completed one cycle (e.g., at times 314 and 318). This ensures that the device is allocated with the processing resources to fetch commands from each respective virtual machine of the host. In some embodiments, the first credits value is also updated by the completion of a cycle of a carryover timer (e.g., at time 320), which is used to reset the first credits value to a respective initial first credits value 302 to ensure a steady state exchange of processing resources to fetch commands from the virtual machine of the host.

The cycle time of the carryover timer is configured to be greater than the cycle time of the refill timer. In some embodiments, the amount of first credits value added at the completion of a refill timer (e.g., at times 314 and 318) is a preset constant for a respective virtual machine. In some embodiments, each respective virtual machine has a respective and different initial first credits value (e.g., initial first credits value 302) and a respective and different amount of first credits value added at the completion of a respective refill timer (e.g., at times 314 and 318) from other virtual machines in the host.

As shown in FIG. 3A, graph 300 includes predetermined values (e.g., predetermined values 304, 306, 308 and 310) with which arbitration circuitry may compare to the first credits value. In some embodiments, predetermined value 310 may hereafter be referred to as halting first credits value 310. The halting first credits value 310 may be indicative of the number of commands capable of being fetched from the respective virtual machine at which the arbitration circuitry should pause selecting the respective virtual machine when determining from which queue groups to fetch commands. In the example provided in graph 300, the respective virtual machine has five possible states for the first credits value: (a) a first state when the first credits value is greater than or equal to predetermined value 304, (b) a second state when the first credits value is less than predetermined value 304 and greater than or equal to predetermined value 306, (c) a third state when the first credits value is less than predetermined value 306 and greater than or equal to predetermined value 308, (d) a fourth state when the first credits value is less than predetermined value 308 and greater than or equal to halting first credits value 310, and (e) a fifth state, or halting state, when the first credits value is less than the halting first credits value 310.

In some embodiments, each predetermined value (e.g., 304, 306, 308, and 310) is configured based on a priority to fetch commands from a queue group associated with the respective virtual machine at a respective amount of processing resources to fetch commands to fetch commands. For example, the first state is of a higher priority than the second state, such that the arbitration circuitry would select a first virtual machine of a first state over a second virtual machine of a second state from which to fetch commands.

As command fetch circuitry of the device fetches command from the respective virtual machine, first credits value decrease from the initial first credits value 302, which is in the first state, and as time continues falls through each of the second state, third state, and fourth state. At time 312, the first credits value is reduced by at least one fetched command from the queue group associated with the respective virtual machine such that the first credits value drops below the halting first credits value 310. The first credits value remains in the halting state for a number of cycles as the arbitration circuitry will not select the respective virtual machine for further command fetching arbitration, until time 314. At time 314, a cycle of the refill timer has completed and the first credits value has been increased to allocate processing resources to fetch commands from the respective virtual machine such that the respective virtual machine is within the first state for first credits value.

After time 314, arbitration circuitry selects the respective virtual machine for further command fetching, reducing the first credits value until the first credits value drops into the second state at time 316. In some examples, the arbitration circuitry may select another respective virtual machine of a higher state (e.g., the first state) from which to fetch commands, and therefore the first credits value of the respective virtual machine remains unchanged until time 318, where refill timer has completed another cycle. At time 320, a cycle of the carryover timer of the respective virtual machine has completed, resetting the first credits value of the respective virtual machine to the initial first credits value 302. The carryover timer is configured to ensure a steady state exchange of processing resources to fetch commands from the respective virtual machine.

Figure 3B:
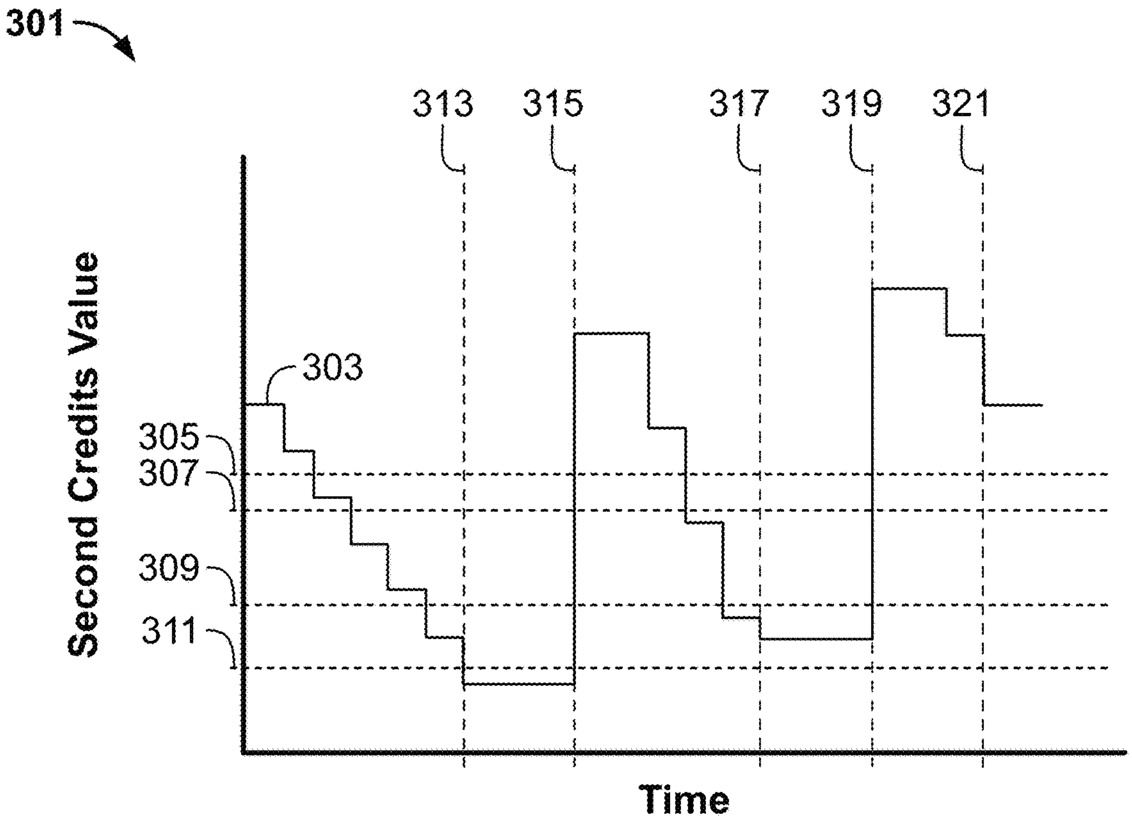
FIG. 3B shows a graph of second credits value over time for an implementation of the device of FIG. 1, in accordance with some embodiments of the present disclosure.

FIG. 3B shows a graph 301 of second credits value over time for an implementation of the device of FIG. 1, in accordance with some embodiments of the present disclosure. In some embodiments, the second credits value of a virtual machine is determined based on an amount of processing bandwidth resources allocated for fetching commands from the queue group associated with the respective virtual machine. The second credits value may be initialized at an initial state (e.g., first state) and an initial second credits value 303, which may be preset prior to operation of the device. The second credits value of a respective virtual machine may be updated over time, such that the second credits value decreases as commands are fetched from the queue group associated with the respective virtual machine. The second credits value may be increased due to a refill of second credits value. In some embodiments refills occur once after a repeated refill timer has completed one cycle (e.g., at times 315 and 319). This ensures that the device is allocated with the processing bandwidth resources to fetch commands from each respective virtual machine of the host. In some embodiments, the second credits value is also updated by the completion of a cycle of a carryover timer (e.g., at time 321), which is used to reset the second credits value to a respective initial second credits value 303 to ensure a steady state exchange of processing bandwidth resources to fetch commands from the virtual machine of the host.

In some embodiments, the amount of second credits value added at the completion of a refill timer (e.g., at times 315 and 319) is a preset constant for a respective virtual machine. In some embodiments, each respective virtual machine has a respective and different initial second credits value (e.g., initial second credits value 302) and a respective and different amount of second credits value added at the completion of a respective refill timer (e.g., at times 315 and 319) from other virtual machines in the host.

As shown in FIG. 3B, graph 301 includes predetermined values (e.g., predetermined values 305, 307, 309, and 311) with which arbitration circuitry may compare to the second credits value. In some embodiments, predetermined value 311 may hereafter be referred to as halting second credits value 311. The halting second credits value 311 may be indicative of the maximum amount of transferred data of the fetched commands from the respective virtual machine. Therefore, at halting second credits value 311 the arbitration circuitry pauses the selecting of the respective virtual machine when determining from which queue groups to fetch commands and fetch commands from another virtual machine of the host. In the example provided in graph 301, the respective virtual machine has five possible states for the second credits value: (a) a first state when the second credits value is greater than or equal to predetermined value 305, (b) a second state when the second credits value is less than predetermined value 305 and greater than or equal to predetermined value 307, (c) a third state when the second credits value is less than predetermined value 307 and greater than or equal to predetermined value 309, (d) a fourth state when the second credits value is less than predetermined value 309 and greater than or equal to halting second credits value 311, and (e) a fifth state, or halting state, when the second credits value is less than the halting second credits value 311.

In some embodiments, similar to those in FIG. 3A, each predetermined value (e.g., 305, 307, 309, and 311) shown in FIG. 3B is configured based on a priority to fetch commands from a queue group associated with the respective virtual machine at a respective amount of processing bandwidth resources to fetch commands. For example, the first state is of a higher priority than the second state, such that the arbitration circuitry would select a first virtual machine of a first state over a second virtual machine of a second state from which to fetch commands.

As command fetch circuitry of the device fetches command from the respective virtual machine, second credits value decrease from the initial second credits value 303, which is in the first state and as time continues falls through each of the second state, third state, and fourth state. At time 313, the second credits value is reduced by at least one fetched command from the queue group associated with the respective virtual machine such that the second credits value drops below the halting second credits value 311. The second credits value remains in the halting state for a number of cycles as the arbitration circuitry will not select the respective virtual machine for further command fetching arbitration, until time 315. At time 315, a cycle of the refill timer has completed and the second credits value has been increased to allocate processing bandwidth resources to fetch commands from the respective virtual machine such that the respective virtual machine is within the first state for second credits value.

After time 315, arbitration circuitry selects the respective virtual machine for further command fetching, reducing the second credits value based on the data transfer size of each fetched command until the second credits value drops into the second state at time 317. In some examples, the arbitration circuitry may select another respective virtual machine of a higher state (e.g., the first state) from which to fetch commands, and therefore the second credits value of the respective virtual machine remains unchanged until time 319, where refill timer has completed another cycle. At time 321, a cycle of the carryover timer of the respective virtual machine has completed, resetting the second credits value of the respective virtual machine to the initial second credits value 303. The carryover timer is configured to ensure a steady state exchange of processing bandwidth resources to fetch commands from the respective virtual machine.

Figure 4:
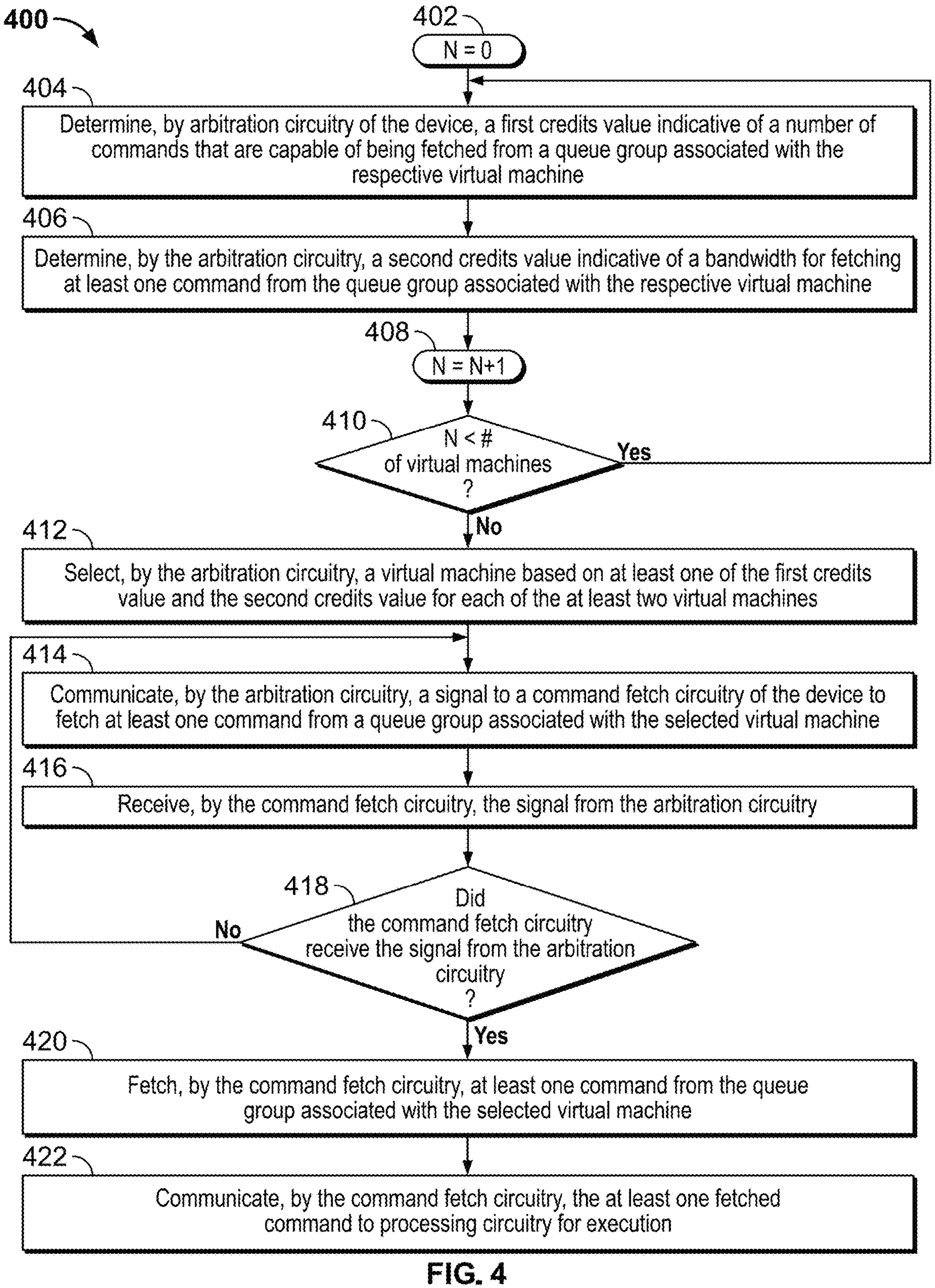
FIG. 4 shows a flowchart of illustrative steps of a process for managing command fetches for a device, in accordance with some embodiments of the present disclosure.

FIG. 4 shows a flowchart of illustrative steps of a process 400 for managing command fetches for a device, in accordance with some embodiments of the present disclosure. In some embodiments, the referenced system, device, arbitration circuitry, processing circuitry, memory, host, command fetch circuitry, system memory, queue groups, virtual machines, and queue sets may be implemented/represented as system 100, device 102, arbitration circuitry 103, processing circuitry 104, memory 105, host 106, command fetch circuitry 107, system memory 108, queue groups (e.g., 110, 112), virtual machines (e.g., 111, 113) and queue sets (e.g., 114, 116, 118, 120, 122, 124, 126). In some embodiments, process 400 can be modified by, for example, having steps rearranged, changed, added, and/or removed.

At step 402, process 400 initializes counter N to 0, as following steps 404-410 form a loop to evaluate each queue group associated with the virtual machines of the host. In some embodiments, the queue groups and their respective queue sets are allocated in the system memory of the device. Step 402, along with steps 408 and 410 are illustrated to indicate that counter N may be updated or compared to other values in order to proceed to other steps. Although FIG. 4 shows counter N used for process 400, a counter Nis not necessarily implemented in the device for arbitration circuitry to evaluate each of the queue groups allocated in system memory. Once counter Nis initialized, process 400 proceeds to step 404.

At step 404, the arbitration circuitry of the device determines a first credits value indicative of a number of commands capable of being fetched from a queue group associated with the respective virtual machine (e.g., virtual machine N). In some embodiments, the first credits value for a respective virtual machine (e.g., virtual machine N) determined by arbitration circuitry as a number of commands (e.g., Input/Outputs (I/Os)) which may be fetched from the queue group (e.g., queue group N) of the associated virtual machine. In some embodiments, the first credits value of a virtual machine is determined based on an amount of processing resources allocated for fetching a number commands from the queue group associated with the virtual machine. The first credits value may be initialized at an initial state and an initial first credits value, which may be preset prior to operation of the device. The first credits value of a respective virtual machine may be updated over time, such that the first credits value decreases as commands are fetched from the queue group associated with the respective virtual machine. In addition, the first credits value may be increased due to a refill of first credits value. In some embodiments refills occur once after a repeated refill timer has completed one cycle. This ensures that the device is allocated with the processing resources to fetch commands from each respective virtual machine of the host. In some embodiments, the first credits value is also updated by the completion of a cycle of a carryover timer, which is used to reset the first credits value to a respective initial first credits value to ensure a steady state exchange of processing resources to fetch commands from the virtual machine of the host. Once the arbitration circuitry determines the first credits value of the respective virtual machine (e.g., virtual machine N) of the host, the arbitration circuitry then determines a second credits value of the respective virtual machine, at step 406.

At step 406, the arbitration circuitry of the device determines a second credits value indicative of a bandwidth for fetching at least one command from the queue group associated with the respective virtual machine (e.g., virtual machine N). In some embodiments, the second credits value for a respective virtual machine (e.g., virtual machine N) determined by arbitration circuitry as an amount of processing bandwidth allocated to fetch commands (e.g., amount of data associated with fetched commands) from the queue group (e.g., queue group N) of the associated virtual machine. In some embodiments, the second credits value of a virtual machine is determined based on an amount of processing bandwidth resources allocated for fetching an amount of data associated with commands of the queue group associated with the virtual machine. The second credits value may be initialized at an initial state and an initial second credits value, which may be preset prior to operation of the device. The second credits value of a respective virtual machine may be updated over time, such that the second credits value decreases as commands are fetched from the queue group associated with the respective virtual machine. In addition, the second credits value may increase due to a refill of the second credits value. In some embodiments refills occur once after a repeated refill timer has completed one cycle. This ensures that the device is allocated with the processing bandwidth resources to fetch commands of a certain data size from each respective virtual machine of the host. In some embodiments, the second credits value is also updated by the completion of a cycle of a carryover timer, which is used to reset the second credits value to a respective initial second credits value to ensure a steady state exchange of processing bandwidth resources to fetch commands from the virtual machine of the host. Once the arbitration circuitry determines the second credits value of the respective virtual machine (e.g., virtual machine N) of the host, the arbitration circuitry then proceeds to step 408 to increment counter N.

At step 408, counter Nis incremented by one value. Counter N is incremented in order for arbitration circuitry to evaluate another queue group associated with another virtual machine of the host. Once counter Nis incremented, process 400 then proceeds to step 410 to determine whether there are further queue groups to be evaluated.

At step 410, counter Nis compared to the number of virtual machines in the host. In some embodiments, the number of virtual machines in the host is a same number as the number of queue groups. This comparison is indicative of whether there is at least one virtual machine and associated queue group which has yet to be evaluated by steps 404 and 406. When counter Nis less than the number of virtual machines, process 400 proceeds to step 404 in order to evaluate another respective virtual machine (e.g., virtual machine N+1) and corresponding queue group. When counter N is greater than or equal to the number of virtual machines, each of the virtual machines of the host, and their corresponding queue groups have been evaluated and process 400 proceeds to step 412 to select a virtual machine based on at least one of the first credits value and the second credits value for each of the virtual machines evaluated at steps 404 and 406.

At step 412, the arbitration circuitry selects a virtual machines based on at least one of the first credits value and the second credits value for each of the virtual machines of the host. In some embodiments, arbitration circuitry determines a state for each of the first credits value and the second credits value of the virtual machine. The state of the first credits value is based on the first credits value and at least a first predetermined value. The state of the second credits value is based on the second credits value and at least a second predetermine value. In some embodiments, as shown in FIG. 3A and FIG. 3B, each state of the first credits value and the second credits value is determined based on more than one predetermined value. In some embodiments, each predetermined value for the first credits value and second credits value may be preset prior to operation of the device and command fetch arbitration. In some embodiments, each predetermined value is configured based on a priority to fetch commands from a queue group associated with a virtual machine at a respective amount of processing resources to fetch commands or a respective amount of processing bandwidth resources to fetch commands. For example, when the state of each of the first credits value is based on one predetermined value (e.g., first predetermined value for first credits value and second predetermined value for second credits value), there are two possible states (e.g., a first state and a second state) that may be determined for each of the first credits value and a second credits value. In such an example, the first state is of a higher priority than the second state, such that the arbitration circuitry selects a first virtual machine of a first state over a second virtual machine of a second state from which to fetch commands, wherein each of the first state and second state refers to either a state of first credits value or a state of second credits value. The arbitration circuitry is configured to select the virtual machine based on at least one of a highest state of first credits value and a highest state of second credits value. In some embodiments, when two or more respective virtual machines of the virtual machines of the host are of the same first credits value state and second credits value state, the arbitration circuitry randomly selects among the two or more respective virtual machines. In some embodiments, when two or more respective virtual machines of the virtual machines of the host are of the same first credits value state and second credits value state, the arbitration circuitry selects among the two or more respective virtual machines using a weighted priority selection. Therefore, when first virtual machine of a high priority and a second virtual machine of low priority are of the same first credits value state and second credits value state, the arbitration circuitry selects the first virtual machine and associated queue group from which to fetch commands. In some embodiments, the arbitration circuitry selects a virtual machine based on the first credits value for each of the at least two virtual machines of the host. In some embodiments, the arbitration circuitry selects a virtual machine based on the second credits value for each of the at least two virtual machines of the host. Once the arbitration circuitry selects a virtual machine based on at least one of the first credits value and the second credits value for each of the at least two virtual machines, the arbitration circuitry communicates a signal to the command fetch circuitry to fetch at least one command from the queue group associated with the selected virtual machine, at step 414.

At step 414, the arbitration circuitry communicates a signal to the command fetch circuitry of the device to fetch at least one command from a queue group associated with the selected virtual machine. In some embodiments, the signal includes data indicative of the selected virtual machine from which to fetch at least one command. Once the arbitration circuitry communicates the signal to the command fetch circuitry to fetch at least one command from the queue group associated with the selected virtual machine, the command fetch circuitry receives the signal from the arbitration circuitry, at step 416.

At step 416, the command fetch circuitry receives the signal from the arbitration circuitry. Once the command fetch circuitry receives the signal from the arbitration circuitry, the command fetch circuitry determines whether the signal was received from the arbitration circuitry, at step 418.

At step 418, the command fetch circuitry determines whether the signal was received from the arbitration circuitry. When the command fetch circuitry does not receive the signal from the arbitration circuitry, i.e., the signal is lost or corrupted during the transit from the arbitration circuitry, the arbitration circuitry then communicates the signal to the command fetch circuitry of the device to fetch at least one command from the queue group associated with the selected virtual machine, at step 414. When the command fetch circuitry does receive the signal from the arbitration circuitry, the command fetch circuitry fetches at least one command from the queue group associated with the selected virtual machine, at step 420.

At step 420, the command fetch circuitry fetches at least one command from the queue group associated with the selected virtual machine. In some embodiments, the command fetch circuitry sends at least one command fetch request to system memory to fetch at least one command from the queue group associated with the selected virtual machine. In some embodiments, the command fetch circuitry sends at least one command fetch request to the host to fetch at least one command from the queue group associated with the selected virtual machine stored on the host. The command fetch request may include data indicative of the virtual machine from which to fetch commands and a number of commands to be fetched from the associated queue group. The commands fetched from the queue group associated with the selected virtual machine may be from at least one of the queue sets of the queue group. In some embodiments, commands are fetched from queue sets of the queue group associated with the selected virtual machine based on a respective priority of each queue set. Therefore, a first subset of commands fetched from a first queue set of the queue group may be of a high priority, and a second subset of commands subsequently fetched from a second queue set of the queue group may be of a lower priority. In some embodiments, the queue set of the queue group associated with the selected virtual machine from which commands are fetched is selected at random. In some embodiments, the command fetch circuitry fetches commands until any one of the following conditions are met: (a) each command stored in the queue group associated with the selected virtual machine has been fetched, (b) the first credits value of the selected virtual machine has decreased below a halting first credits value, (c) the second credits value of the selected virtual machine has decreased below a halting second credits value, and (d) the command fetch circuitry receives a reset signal. The command fetch circuitry fetches commands which are stored in the submission queue of the queue sets within the queue group associated with the selected virtual machine. Once a command is fetched from the submission queue, the system memory generates a command fetch response which includes at least one fetched command and relevant information regarding the at least one fetched command (e.g., command type and data size). In some embodiments, when the command fetch circuitry fetches commands from queue groups stored on the host, the host generates the command fetch response which includes at least one fetched command. The command fetch response may be stored in the corresponding completion queue of the queue set from which the command was fetched. When the command fetch circuitry fetches a command from the queue group associated with a respective virtual machine, the command fetch circuitry may communicate a signal to the arbitration circuitry to decrement the first credits value of the respective virtual machine to reflect a use of the processing resource to fetch commands from the respective virtual machine. In some embodiments, the command fetch circuitry may determine the data size of the fetched command based on the command fetch response. In such embodiments, the command fetch circuitry may communicate a signal to the arbitration circuitry to decrement the second credits value of the respective virtual machine to reflect the amount of bandwidth required to fetch the command of the command fetch response from the respective virtual machine. The command fetch response is then sent to the command fetch circuitry to be communicated to the processing circuitry for execution, at step 422.

At step 422, the command fetch circuitry communicates the at least one fetched command to processing circuitry for execution. In some embodiments, the processing circuitry communicates a signal to the arbitration circuitry to decrement the second credits value of the respective virtual machine to reflect the amount of bandwidth required to fetch the command of the command fetch response from the respective virtual machine.

Figure 5:
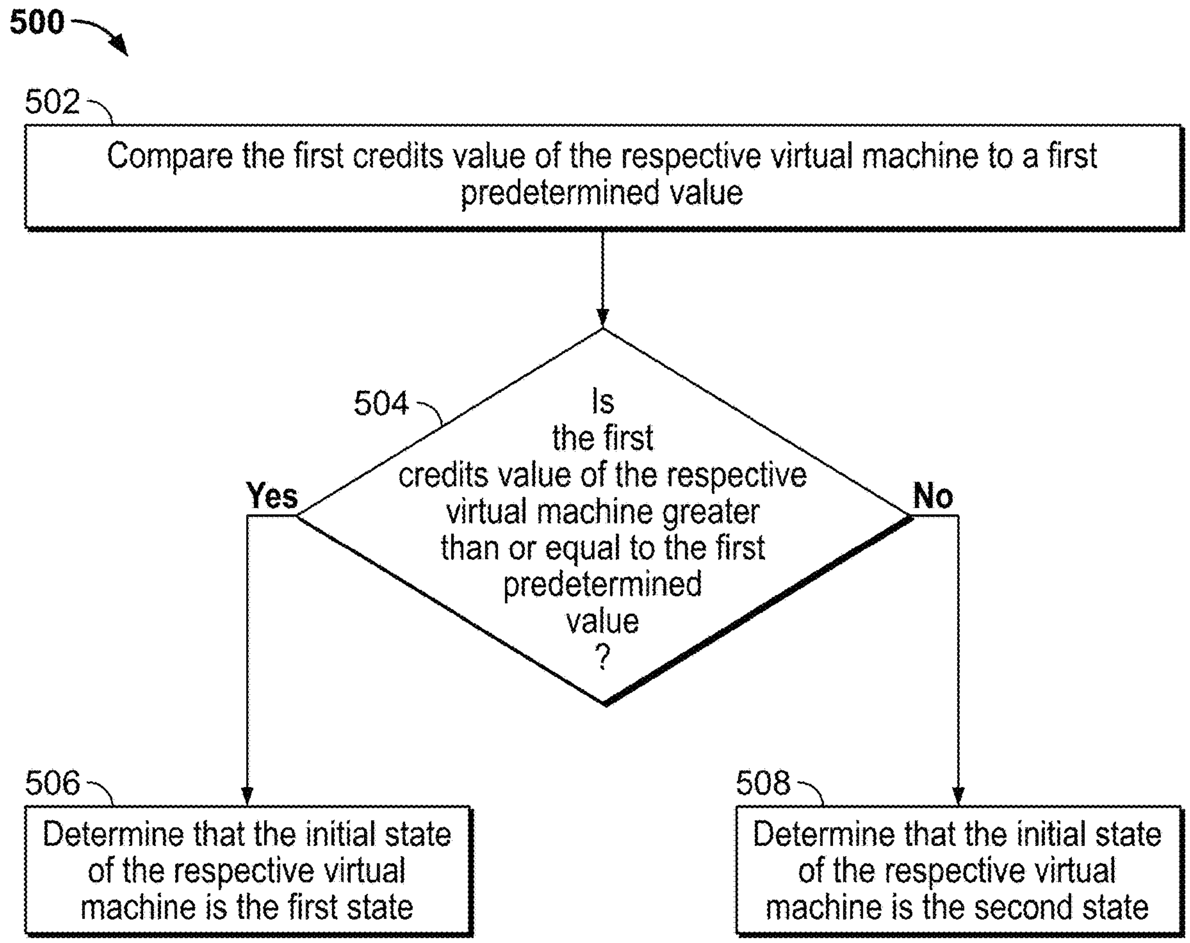
FIG. 5 shows a flowchart of illustrative steps of a subprocess for determining an initial state of a virtual machine of the host based on a first credits value, in accordance with some embodiments of the present disclosure.

FIG. 5 shows a flowchart of illustrative steps of a subprocess 500 for determining an initial state of a virtual machine of the host based on a first credits value, in accordance with some embodiments of the present disclosure. In some embodiments, the referenced system, device, arbitration circuitry, processing circuitry, memory, host, command fetch circuitry, system memory, queue groups, virtual machines, and queue sets may be implemented/represented as system 100, device 102, arbitration circuitry 103, processing circuitry 104, memory 105, host 106, command fetch circuitry 107, system memory 108, queue groups (e.g., 110, 112), virtual machines (e.g., 111, 113) and queue sets (e.g., 114, 116, 118, 120, 122, 124, 126). In some embodiments, subprocess 500 can be modified by, for example, having steps rearranged, changed, added, and/or removed.

At step 502, the arbitration circuitry compares the first credits value of the respective virtual machine (e.g., virtual machine N) to a first predetermined value. In some embodiments, once the arbitration circuitry compares the first credits value of the respective virtual machine to the first predetermined value, the arbitration circuitry then compares the first credits value of the respective virtual machine to additional predetermined values. In some embodiments the first predetermined value may be configured based on a constant first credits value for each virtual machine. In some embodiments, each virtual machine has a respective first predetermined value, where each respective first predetermined value is not necessarily the same value. In some embodiments, the first predetermined value of a respective virtual machine is determined based on an amount of processing resources allocated for fetching commands from the queue group associated with the respective virtual machine. The first predetermined value for each virtual machine may be preset before the device fetches commands from the host. In some embodiments, the first predetermined value of the respective virtual machine be represented by a number of commands of a particular size. The first predetermined value for the respective virtual machine may be determined by a share of a total processing resources for fetching commands, which is defined by the processing capabilities of a processor of the command fetch circuitry. In some embodiments, one or more virtual machines may have a greater first predetermined value than other virtual machines. In some embodiments, the arbitration circuitry compares the first credits value of the respective virtual machine to a first predetermined value after each update to the first credits value (e.g., decrease after fetching a command, increase due to refill timer, and reset due to carryover timer). For example, as arbitration circuitry fetches commands from a queue group associated with the respective virtual machine, the first credits value decreases by the number of commands fetched. In some embodiments, the first predetermined value is a halting threshold value. The halting threshold value may be indicative of a number of commands of the respective virtual machine at which the arbitration circuitry should pause selecting the respective virtual machine when determining from which queue groups to fetch commands. Once the arbitration circuitry compares the first credits value of the respective virtual machine to the first predetermined value, the arbitration circuitry proceeds to determine whether the first credits value of the respective virtual machine is greater than or equal to the first predetermined value, at step 504.

At step 504, the arbitration circuitry determines whether the first credits value of the respective virtual machine (e.g., virtual machine N) is greater than or equal to the first predetermined value. When the first credits value of the respective virtual machine (e.g., virtual machine N) is greater than or equal to the first predetermined value, the arbitration circuitry determines that the initial state of the respective virtual machine (e.g., virtual machine N) is a first state, at step 506. When the first credits value of the respective virtual machine (e.g., virtual machine N) is less than the first predetermined value, the arbitration circuitry determines that the initial state of the respective virtual machine (e.g., virtual machine N) is a second state, at step 508.

At step 506, the arbitration circuitry determines that the initial state of the respective virtual machine (e.g., virtual machine N) is the first state. When the arbitration circuitry determines that the first credits value of the respective virtual machine is greater than or equal to the first predetermined value based on the determination made at step 504, the arbitration circuitry determines that the initial state of the respective virtual machine is the first state. In some embodiments, a first state of the first credits value is associated with a high priority and a second state of the first credits value is associated with a low priority. In some embodiments, the arbitration circuitry is more likely to select a virtual machine of a state with a higher priority (e.g., first state). In some embodiments, when there are additional predetermined values to which the arbitration circuitry compares the first credits value, there are also additional states (e.g., a third state) which may be determined as the initial state of the respective virtual machine. In such embodiments, the third state would be associated with a priority which is lower than that of the second state.

At step 508, the arbitration circuitry determines that the initial state of the respective virtual machine (e.g., virtual machine N) is the second state. When the arbitration circuitry determines that the first credits value of the respective virtual machine is less than the first predetermined value based on the determination made at step 504, the arbitration circuitry determines that the initial state of the respective virtual machine is the second state, which is of a lesser priority than the first state.

Figure 6:
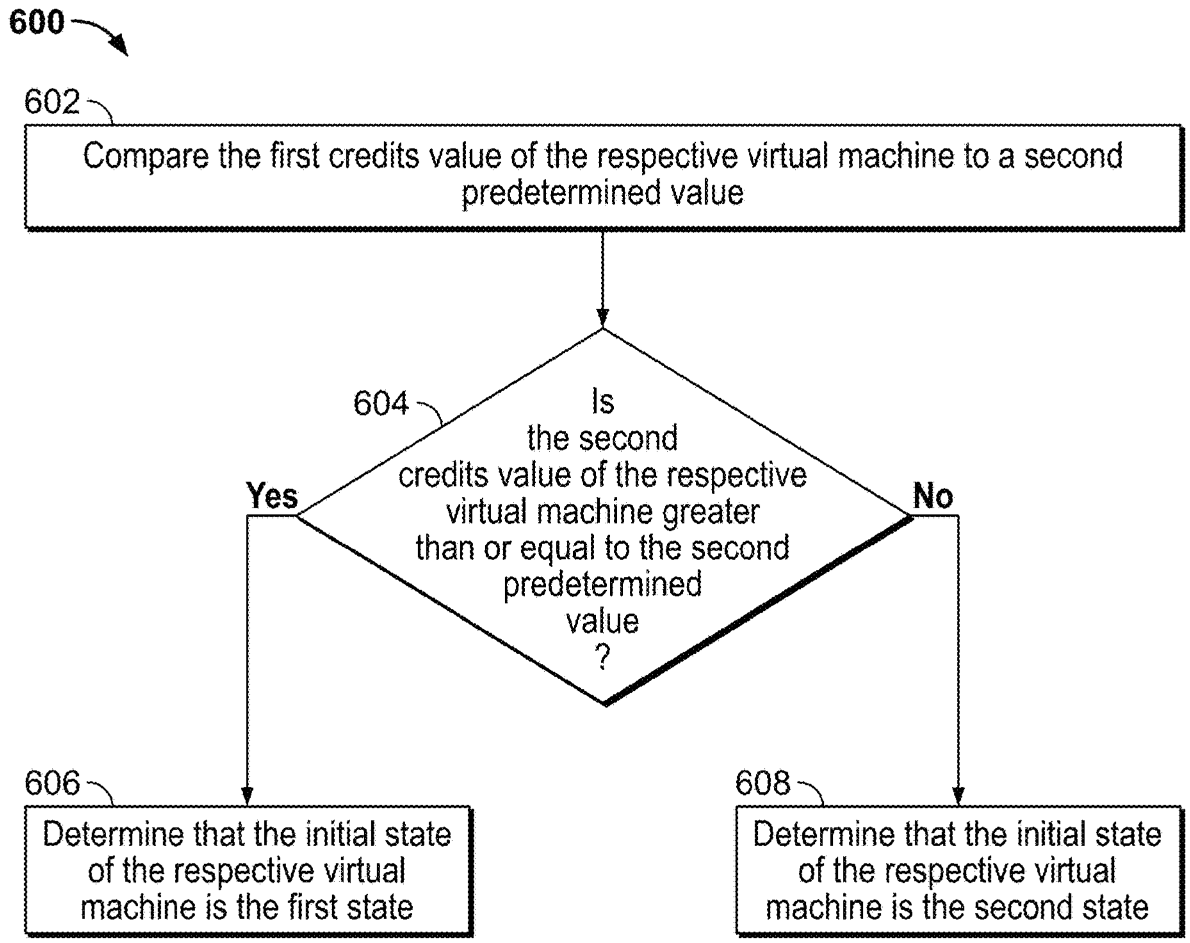
FIG. 6 shows a flowchart of illustrative steps of a subprocess for determining an initial state of a virtual machine of the host based on a second credits value, in accordance with some embodiments of the present disclosure.

FIG. 6 shows a flowchart of illustrative steps of a subprocess 600 for determining an initial state of a virtual machine of the host based on a second credits value, in accordance with some embodiments of the present disclosure. In some embodiments, the referenced system, device, arbitration circuitry, processing circuitry, memory, host, command fetch circuitry, system memory, queue groups, virtual machines, and queue sets may be implemented/represented as system 100, device 102, arbitration circuitry 103, processing circuitry 104, memory 105, host 106, command fetch circuitry 107, system memory 108, queue groups (e.g., 110, 112), virtual machines (e.g., 111, 113) and queue sets (e.g., 114, 116, 118, 120, 122, 124, 126). In some embodiments, subprocess 600 can be modified by, for example, having steps rearranged, changed, added, and/or removed.

At step 602, the arbitration circuitry compares the second credits value of the respective virtual machine (e.g., virtual machine N) to a second predetermined value. In some embodiments, once the arbitration circuitry compares the second credits value of the respective virtual machine to the second predetermined value, the arbitration circuitry then compares the second credits value of the respective virtual machine to additional predetermined values. In some embodiments the second predetermined value may be configured based on a constant second credits value for each virtual machine. In some embodiments, each virtual machine has a respective second predetermined value, where each respective second predetermined value is not necessarily the same value. In some embodiments, the second predetermined value of a respective virtual machine is determined based on an amount of processing bandwidth resources allocated for fetching commands from the queue group associated with the respective virtual machine. The second predetermined value for each virtual machine may be preset before the device fetches commands from the host. In some embodiments, the second predetermined value of the respective virtual machine be represented by an amount of data for commands. The second predetermined value for the respective virtual machine may be determined by a share of a total processing bandwidth resources for fetching commands, which is defined by the processing capabilities of a processor of the command fetch circuitry. In some embodiments, one or more virtual machines may have a greater second predetermined value than other virtual machines. In some embodiments, the arbitration circuitry compares the second credits value of the respective virtual machine to a second predetermined value after each update to the second credits value (e.g., decrease after fetching a command, increase due to refill timer, and reset due to carryover timer). For example, as arbitration circuitry fetches commands from a queue group associated with the respective virtual machine, the second credits value decreases by an amount of data of the fetched commands. In some embodiments, the second predetermined value is a halting threshold value. The halting threshold value may be indicative of the amount of data needed to fetch commands from the respective virtual machine at which the arbitration circuitry should pause selecting the respective virtual machine when determining from which queue groups to fetch commands. Once the arbitration circuitry compares the second credits value of the respective virtual machine to the second predetermined value, the arbitration circuitry proceeds to determine whether the second credits value of the respective virtual machine is greater than or equal to the second predetermined value, at step 604.

At step 604, the arbitration circuitry determines whether the second credits value of the respective virtual machine (e.g., virtual machine N) is greater than or equal to the second predetermined value. When the second credits value of the respective virtual machine (e.g., virtual machine N) is greater than or equal to the second predetermined value, the arbitration circuitry determines that the initial state of the respective virtual machine (e.g., virtual machine N) is a first state, at step 606. When the second credits value of the respective virtual machine (e.g., virtual machine N) is less than the second predetermined value, the arbitration circuitry determines that the initial state of the respective virtual machine (e.g., virtual machine N) is a second state, at step 608.

At step 606, the arbitration circuitry determines that the initial state of the respective virtual machine (e.g., virtual machine N) is the first state. When the arbitration circuitry determines that the second credits value of the respective virtual machine is greater than or equal to the second predetermined value based on the determination made at step 604, the arbitration circuitry determines that the initial state of the respective virtual machine is the first state. In some embodiments, a first state of the second credits value is associated with a high priority and a second state of the second credits value is associated with a low priority. In some embodiments, the arbitration circuitry is more likely to select a virtual machine of a state with a higher priority (e.g., first state). In some embodiments, when there are additional predetermined values to which the arbitration circuitry compares the second credits value, there are also additional states (e.g., a third state) which may be determined as the initial state of the respective virtual machine. In such embodiments, the third state would be associated with a priority which is lower than that of the second state.

At step 608, the arbitration circuitry determines that the initial state of the respective virtual machine (e.g., virtual machine N) is the second state. When the arbitration circuitry determines that the second credits value of the respective virtual machine is less than the second predetermined value based on the determination made at step 604, the arbitration circuitry determines that the initial state of the respective virtual machine is the second state, which is of a lesser priority than the first state.

The terms “an embodiment”, “embodiment”, “embodiments”, “the embodiment”, “the embodiments”, “one or more embodiments”, “some embodiments”, and “one embodiment” mean “one or more (but not all) embodiments” unless expressly specified otherwise.

The terms “including”, “comprising”, “having” and variations thereof mean “including but not limited to”, unless expressly specified otherwise.

The enumerated listing of items does not imply that any or all of the items are mutually exclusive, unless expressly specified otherwise.

The terms “a”, “an” and “the” mean “one or more”, unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A device that is communicatively coupled to a host, the device comprising:
- arbitration circuitry to:
  - for each respective virtual machine of at least two virtual machines of the host:
    - determine a first credits value indicative of a number of commands that are capable of being fetched from a queue group associated with the respective virtual machine; and
    - determine a second credits value indicative of a bandwidth for fetching at least one command from the queue group associated with the respective virtual machine;
  - select a virtual machine based on at least one of the first credits value and the second credits value for each of the at least two virtual machines; and
  - communicate a signal to a command fetch circuitry to fetch at least one command from a queue group associated with the selected virtual machine; and
- the command fetch circuitry communicatively coupled to the arbitration circuitry, the command fetch circuitry to:
  - receive the signal from the arbitration circuitry; and
  - in response to the reception of the signal:
    - fetch at least one command from the queue group associated with the selected virtual machine; and
    - communicate the at least one fetched command to processing circuitry for execution.

2. The device of claim 1, wherein the command fetch circuitry is further to:
- receive a command associated with a first virtual machine from the host;
- store the command at a queue group associated with the first virtual machine; and
- wherein the first virtual machine is one of the at least two virtual machines.

3. The device of claim 1, wherein the arbitration circuitry is further to:
- for each respective virtual machine of the at least two virtual machines of the host:
  - determine an initial state of the respective virtual machine based on at least one of the first credits value and the second credits value; and wherein the initial state is any one of a first state and a second state.

4. The device of claim 3, wherein to determine the initial state of the respective virtual machine the arbitration circuitry is to:

compare the first credits value of the respective virtual machine to a first predetermined value;

in response to the first credits value of the respective virtual machine being greater than or equal to the first predetermined value:

determine that the initial state of the respective virtual machine is the first state; and in response to the first credits value of the respective virtual machine being less than the first predetermined value:

determine that the initial state of the respective virtual machine is the second state.

5. The device of claim 3, wherein to determine the initial state of the respective virtual machine the arbitration circuitry is to:

compare the second credits value of the respective virtual machine to a second predetermined value;

in response to the second credits value of the respective virtual machine being greater than or equal to the second predetermined value:

determine that the initial state of the respective virtual machine is the first state; and in response to the second credits value of the respective virtual machine being less than the second predetermined value:

determine that the initial state of the respective virtual machine is the second state.

6. The device of claim 3, wherein to select the virtual machine the arbitration circuitry is to:

determine a first subset of virtual machines, wherein each virtual machine of the first subset of virtual machines is of the first state; and select the virtual machine by selecting one of the first subset of virtual machines.

7. The device of claim 3, wherein the initial state is any one of the first state, the second state, and a third state.

8. The device of claim 7, wherein to select the virtual machine the arbitration circuitry is to:

determine a second subset of virtual machines, wherein each virtual machine of the second subset of virtual machines is of the second state;

determine a third subset of virtual machines, wherein each virtual machine of the third subset of virtual machines of the third state, wherein:

when the second subset of virtual machines comprises at least one virtual machine of the second state:

select the virtual machine by selecting one of the second subset of virtual machines; and when the second subset of virtual machines does not comprise any virtual machine and the third subset of virtual machines comprises at least one virtual machine of the third state:

select the virtual machine by selecting one of the third subset of virtual machines.

9. The device of claim 7, wherein to determine the initial state of the respective virtual machine the arbitration circuitry is to:

compare the first credits value of the respective virtual machine to a first predetermined value and a third predetermined value;

in response to the first credits value of the respective virtual machine being greater than or equal to the first predetermined value:

determine that the initial state of the respective virtual machine is the first state;

in response to the first credits value of the respective virtual machine being less than the first predetermined value and greater than or equal to the third predetermined value:

determine that the initial state of the respective virtual machine is the second state; and in response to the first credits value of the respective virtual machine being less than the third predetermined value:

determine that the initial state of the respective virtual machine is the third state.

10. The device of claim 7, wherein to determine the initial state of the respective virtual machine the arbitration circuitry is to:

compare the second credits value of the respective virtual machine to a second predetermined value and a fourth predetermined value;

in response to the second credits value of the respective virtual machine being greater than or equal to the second predetermined value:

determine that the initial state of the respective virtual machine is the first state;

in response to the second credits value of the respective virtual machine being less than the second predetermined value and greater than or equal to the fourth predetermined value:

determine that the initial state of the respective virtual machine is the second state; and in response to the second credits value of the respective virtual machine being less than the fourth predetermined value:

determine that the initial state of the respective virtual machine is the third state.

11. The device of claim 1, wherein each queue group comprises at least one queue set, each queue set comprises a submission queue and a completion queue, and wherein:

each submission queue is to:

receive a command from a virtual machine of the host; and store the received command; and each completion queue is to store at least one command fetch response.

12. The device of claim 1, wherein in response to communicating the at least one fetched command of the selected virtual machine to the processing circuitry for execution the command fetch circuitry is to:

for each fetched command of the at least one fetched command:

communicate a command fetch response to the arbitration circuitry to cause the arbitration circuitry to update each of the first credits value and the second credits value of the selected virtual machine, wherein the command fetch response comprises command size data.

13. The device of claim 12, wherein to update each of the first credits value and the second credits value of the selected virtual machine the arbitration circuitry is to:

decrement the first credits value by one unit value; and decrement the second credits value based on the command size data of the command fetch response.

14. The device of claim 1, wherein the arbitration circuitry is further to:

receive commands from the at least two virtual machines of the host, wherein:

each respective virtual machine of the host comprises at least one application which is mapped to the queue group associated with the respective virtual machine.

15. The device of claim 1, wherein the arbitration circuitry is further to:

determine, using a refill timer, a time to refill each of the first credits value and the second credits value for each respective virtual machine; and in response to the determination, using the refill timer, of the time to refill each of the first credits value and the second credits value for each respective virtual machine:

for each respective virtual machine:

increment the first credits value by a predetermined first credit refill value for the respective virtual machine; and increment the second credits value by a predetermined second credit refill value for the respective virtual machine.

16. The device of claim 1, wherein:

the first credits value is initialized at a first credits initial value and the second credits value is initialized at a second credits initial value; and the arbitration circuitry is further to:

determine, using a carryover timer, a time to reset each of the first credits value and the second credits value for each respective virtual machine; and in response to the determination, using the carryover timer, of the time to reset each of the first credits value and the second credits value for each respective virtual machine:

for each respective virtual machine:

reset the first credits value to the first credits initial value; and reset the second credits value to the second credits initial value.

17. The device of claim 1, wherein to fetch at least one command from the queue group associated with the selected virtual machine the command fetch circuitry is to:

fetch from the selected virtual machine until at least one condition of a set of conditions is met, the set of conditions comprising:

each command stored in the queue group associated with the selected virtual machine has been fetched;

the first credits value of the selected virtual machine has decreased below a halting first credits value;

the second credits value of the selected virtual machine has decreased below a halting second credits value; and the command fetch circuitry receives a reset signal.

18. A method for managing command fetches for a device communicatively coupled to a host, the method comprising:

for each respective virtual machine of at least two virtual machines of the host:

determining, by an arbitration circuitry of the device, a first credits value indicative of a number of commands that are capable of being fetched from a queue group associated with the respective virtual machine; and determining, by the arbitration circuitry, a second credits value indicative of a bandwidth for fetching at least one command from the queue group associated with the respective virtual machine;

selecting, by the arbitration circuitry, a virtual machine based on at least one of the first credits value and the second credits value for each of the at least two virtual machines;

communicating, by the arbitration circuitry, a signal to a command fetch circuitry of the device to fetch at least one command from a queue group associated with the selected virtual machine;

receiving, by the command fetch circuitry, the signal from the arbitration circuitry; and in response to receiving the signal:

fetching, by the command fetch circuitry, at least one command from the queue group associated with the selected virtual machine; and communicating, by the command fetch circuitry, the at least one fetched command to processing circuitry for execution.

19. The method of claim 18, further comprising:

receiving a command associated with a first virtual machine from the host;

storing the command at a queue group associated with the first virtual machine; and wherein the first virtual machine is one of the at least two virtual machines.

20. The method of claim 18, further comprising:

for each respective virtual machine of the at least two virtual machines of the host:

determining an initial state of the respective virtual machine based on at least one of the first credits value and the second credits value; and wherein the initial state is any one of a first state and a second state.

21. The method of claim 20, wherein to determining the initial state of the respective virtual machine comprises:

comparing the first credits value of the respective virtual machine to a first predetermined value;

in response to the first credits value of the respective virtual machine being greater than or equal to the first predetermined value:

determining that the initial state of the respective virtual machine is the first state; and in response to the first credits value of the respective virtual machine being less than the first predetermined value:

determining that the initial state of the respective virtual machine is the second state.

22. The method of claim 20, wherein determining the initial state of the respective virtual machine further comprises:

comparing the second credits value of the respective virtual machine to a second predetermined value;

in response to the second credits value of the respective virtual machine being greater than or equal to the second predetermined value:

determining that the initial state of the respective virtual machine is the first state; and in response to the second credits value of the respective virtual machine being less than the second predetermined value:

determining that the initial state of the respective virtual machine is the second state.

23. The method of claim 20, wherein selecting the virtual machine comprises:

determining a first subset of virtual machines, wherein each virtual machine of the first subset of virtual machines is of the first state; and selecting the virtual machine by selecting one of the first subset of virtual machines.

24. The method of claim 20, wherein the initial state is any one of the first state, the second state, and a third state.

25. The method of claim 24, wherein selecting the virtual machine comprises:

determining a second subset of virtual machines, wherein each virtual machine of the second subset of virtual machines is of the second state;

determining a third subset of virtual machines, wherein each virtual machine of the third subset of virtual machines of the third state, wherein:

when the second subset of virtual machines comprises at least one virtual machine of the second state:

selecting the virtual machine by selecting one of the second subset of virtual machines; and when the second subset of virtual machines does not comprise any virtual machine and the third subset of virtual machines comprises at least one virtual machine of the third state:

selecting the virtual machine by selecting one of the third subset of virtual machines.

26. The method of claim 24, wherein determining the initial state of the respective virtual machine comprises:

comparing the first credits value of the respective virtual machine to a first predetermined value and a third predetermined value;

in response to the first credits value of the respective virtual machine being greater than or equal to the first predetermined value:

determining that the initial state of the respective virtual machine is the first state;

in response to the first credits value of the respective virtual machine being less than the first predetermined value and greater than or equal to the third predetermined value:

determining that the initial state of the respective virtual machine is the second state; and in response to the first credits value of the respective virtual machine being less than the third predetermined value:

determining that the initial state of the respective virtual machine is the third state.

27. The method of claim 24, wherein determining the initial state of the respective virtual machine comprises:

comparing the second credits value of the respective virtual machine to a second predetermined value and a fourth predetermined value;

in response to the second credits value of the respective virtual machine being greater than or equal to the second predetermined value:

determining that the initial state of the respective virtual machine is the first state;

in response to the second credits value of the respective virtual machine being less than the second predetermined value and greater than or equal to the fourth predetermined value:

determining that the initial state of the respective virtual machine is the second state; and in response to the second credits value of the respective virtual machine being less than the fourth predetermined value:

determining that the initial state of the respective virtual machine is the third state.

28. The method of claim 18, wherein in response to communicating the at least one fetched command of the selected virtual machine to the processing circuitry for execution the method comprises:

for each fetched command of the at least one fetched command:

communicating a command fetch response to the arbitration circuitry, causing the arbitration circuitry to update each of the first credits value and the second credits value of the selected virtual machine, wherein the command fetch response comprises command size data.

29. The method of claim 28, wherein causing the arbitration circuitry to update each of the first credits value and the second credits value of the selected virtual machine comprises:

decrementing the first credits value by one unit value; and decrementing the second credits value based on the command size data of the command fetch response.

30. The method of claim 18, wherein the method further comprises:

receiving commands from the at least two virtual machines of the host, wherein:

each respective virtual machine of the host comprises at least one application which is mapped to the queue group associated with the respective virtual machine.

31. The method of claim 18, wherein the method further comprises:

determining, using a refill timer, a time to refill each of the first credits value and the second credits value for each respective virtual machine; and in response to determining, using the refill timer, the time to refill each of the first credits value and the second credits value for each respective virtual machine:

for each respective virtual machine:

incrementing the first credits value by a predetermined first credit refill value for the respective virtual machine; and incrementing the second credits value by a predetermined second credit refill value for the respective virtual machine.

32. The method of claim 18, wherein:

the first credits value is initialized at a first credits initial value and the second credits value is initialized at a second credits initial value; and the method further comprises:

determining, using a carryover timer, a time to reset each of the first credits value and the second credits value for each respective virtual machine; and in response to determining, using the carryover timer, the time to reset each of the first credits value and the second credits value for each respective virtual machine:

for each respective virtual machine:

resetting the first credits value to the first credits initial value; and resetting the second credits value to the second credits initial value.

33. The method of claim 18, wherein fetching at least one command from the queue group associated with the selected virtual machine comprises:

fetching from the selected virtual machine until at least one condition of a set of conditions is met, the set of conditions comprising:

each command stored in the queue group associated with the selected virtual machine has been fetched;

the first credits value of the selected virtual machine has decreased below a halting first credits value;

the second credits value of the selected virtual machine has decreased below a halting second credits value; and the command fetch circuitry receives a reset signal.

* * * * *